(12) United States Patent
Shephard

(10) Patent No.: US 6,869,144 B2
(45) Date of Patent: Mar. 22, 2005

(54) PIVOT MECHANISM

(75) Inventor: Philip Charles Shephard, Coventry (GB)

(73) Assignee: ATL Engineering (UK) Limited, Exxex (GB)

( * ) Notice: Subject to any disclaimer, the term of this patent is extended or adjusted under 35 U.S.C. 154(b) by 0 days.

(21) Appl. No.: 09/974,253

(22) Filed: Oct. 9, 2001

(65) Prior Publication Data

US 2002/0057008 A1 May 16, 2002

(30) Foreign Application Priority Data

| Oct. 12, 2000 | (GB) | 0025020 |
| Jan. 15, 2001 | (GB) | 0101007 |
| Apr. 9, 2001 | (GB) | 0108825 |
| May 24, 2001 | (GB) | 0112547 |
| Sep. 24, 2001 | (GB) | 0122892 |

(51) Int. Cl.[7] ............................................. B60N 2/02
(52) U.S. Cl. ....................................................... 297/366
(58) Field of Search ................................. 297/366, 367; 16/354, 221, 239

(56) References Cited

U.S. PATENT DOCUMENTS

| 3,788,698 A | 1/1974 | Perkins |
| 3,901,100 A | 8/1975 | Iida et al. |
| 4,103,964 A | 8/1978 | Klingelhofer et al. |
| 4,146,267 A | 3/1979 | Mori et al. |
| 4,634,182 A | 1/1987 | Tanaka |
| 4,659,146 A | 4/1987 | Janiaud |
| 4,765,680 A | 8/1988 | Kawashima |
| 4,789,205 A | 12/1988 | Pipon et al. |
| 4,872,726 A | 10/1989 | White et al. |
| 4,875,735 A | 10/1989 | Moyer et al. |
| 4,995,669 A | 2/1991 | Croft |
| 5,138,744 A | 8/1992 | Coggon |
| 5,154,476 A | 10/1992 | Haider et al. |
| 5,205,609 A | 4/1993 | Notta et al. |
| 5,224,759 A | 7/1993 | Matsuura et al. |
| 5,328,241 A | 7/1994 | Haider |
| 5,346,281 A | 9/1994 | Hughes |
| 5,433,507 A | 7/1995 | Chang |
| 5,547,255 A | 8/1996 | Ito et al. |
| 5,622,410 A | 4/1997 | Robinson |
| 5,664,836 A * | 9/1997 | Takagi |
| 5,685,611 A | 11/1997 | Eguchi et al. |
| 5,702,156 A | 12/1997 | Takagi |
| 5,733,008 A | 3/1998 | Tame |
| 5,749,625 A | 5/1998 | Robinson |
| 5,788,330 A | 8/1998 | Ryan |
| 5,899,533 A | 5/1999 | Tatematsu et al. |

(List continued on next page.)

FOREIGN PATENT DOCUMENTS

| DE | 2931873 | 2/1981 |
| EP | 0 509 865 | 10/1992 |

(List continued on next page.)

Primary Examiner—Milton Nelson, Jr.
(74) Attorney, Agent, or Firm—Merchant & Gould P.C.

(57) ABSTRACT

A pivot mechanism includes a pivot arm (14) that is rotatably mounted on a base member (1) via a pivot pin (16). The pivot mechanism includes a locking mechanism comprising a convex tooth segment (36) provided on the pivot arm and a locking member (38) having a concave tooth segment (40). The locking member (38) is mounted on the base member (1) for movement between a locked position in which the convex and concave tooth segments arc engaged preventing rotation of the pivot arm (14), and an unlocked position in which the tooth segments disengaged. The center of curvature of the convex tooth segment (36) is offset from the center of curvature of the concave tooth segment (40) whereby, in normal usage, the convex and concave tooth segment a only partially engaged when the locking member is in the locked position.

13 Claims, 35 Drawing Sheets

U.S. PATENT DOCUMENTS

| | | |
|---|---|---|
| 5,934,753 A | 8/1999 | Lange |
| 6,139,104 A | 10/2000 | Brewer |
| 6,139,105 A | 10/2000 | Morgos et al. |
| 6,209,955 B1 | 4/2001 | Seibold |
| 6,273,508 B1 | 8/2001 | Lange |

FOREIGN PATENT DOCUMENTS

| | | | |
|---|---|---|---|
| EP | 0756961 | 2/1997 | |
| EP | 0 832 780 | 4/1998 | |
| GB | 1342371 | 1/1974 | |
| GB | 1 536 104 | 12/1978 | |
| GB | 1 588 867 | 4/1981 | |
| GB | 2 071 756 | 9/1981 | |
| GB | 2 196 052 | 4/1988 | |
| GB | 2297902 | 8/1996 | |
| GB | 2 309 892 | 8/1997 | |
| JP | 04-371103 | 12/1992 | ........... A47C/1/025 |
| JP | 7069114 | 3/1995 | |

* cited by examiner

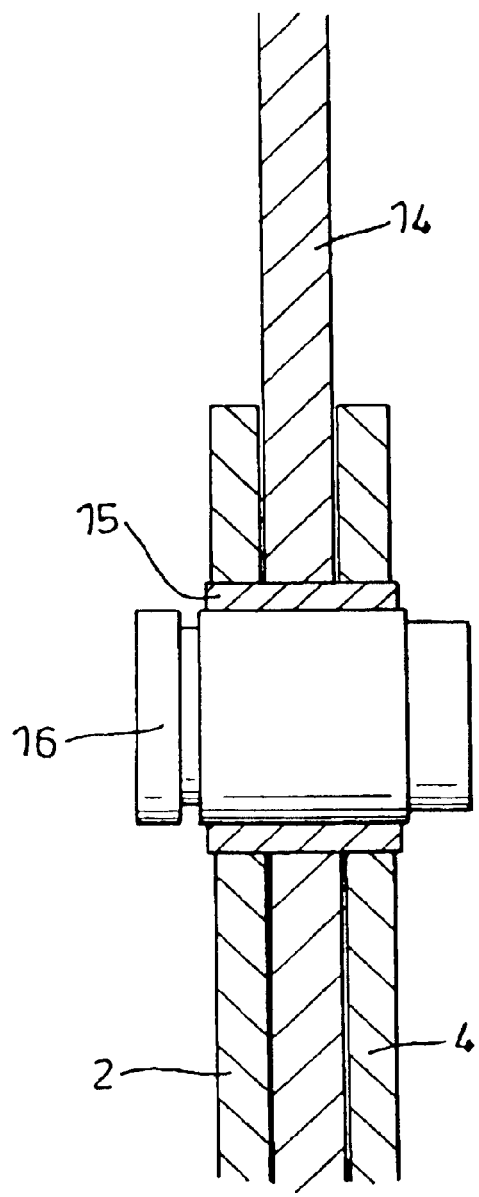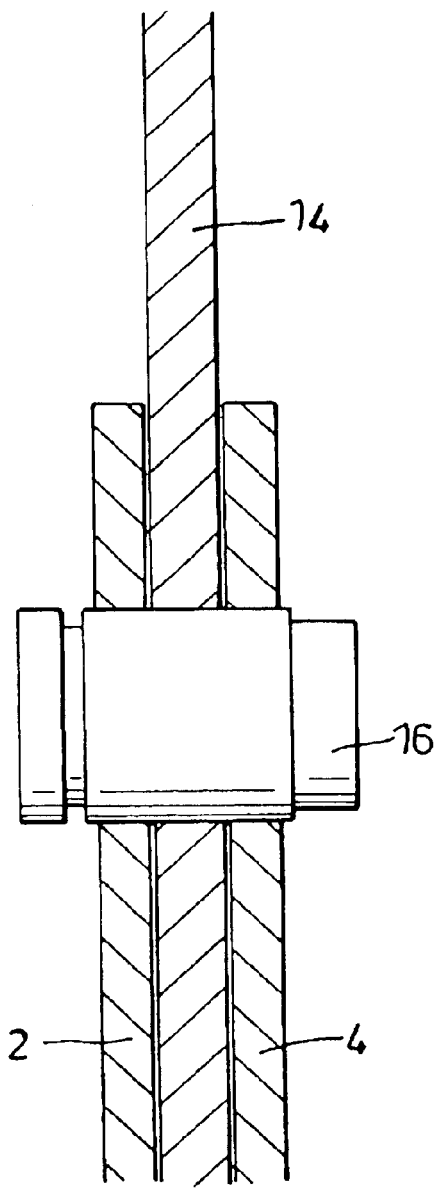
*Fig. 6A*  *Fig. 6B*

PIVOT MECHANISM

The present invention relates to a pivot mechanism and in particular, but not exclusively, to a pivot mechanism for use in a seat recliner mechanism. The invention also relates to a recliner mechanism and a vehicle seat including such a mechanism.

Many vehicle seats include a tilting/tipping mechanism that allows the angle of the seat back to be adjusted. The seat back is generally attached to be seat base through a pivot mechanism that includes a locking mechanism for locking the seat back at the desired angle.

In one such pivot mechanism, for example as described in DE-OS-2931873, the seat back is attached to a pivot arm that is provided with a set of ratchet teeth. Those lead are engaged by a locking plate having a complementary set of teeth. The locking plate can be moved away from the pivot arm to disengage the two sets of teeth, allowing the angle of the seat back to be adjusted, and can be moved back towards the pivot arm, to engage the teeth and lock the seat back in position.

The pivot mechanism naturally has to be able to withstand a number of forces during normal use including in particular the rearwards force caused by a passenger leaning against the seat back. However, for safety and to comply with worldwide legislation, it also has to be able to withstand the much greater forces that might be generated if the vehicle is involved in a collision. In particular, if the seat back carries the upper anchoring point for the seat belt, a very large forward force may be generated in the event of a frontal collision, owing to the inertia of the passenger. Such transient forces may be many times greater than the forces experienced during normal usage and the pivot mechanism must be able to withstand them without collapsing.

The very large forces generated by a collision can cause plastic deformation of the pivot mechanism. For example, the pivot pin on which the pivot arm is mounted may be driven forwards, causing partial separation of the two sets of teeth forming the locking mechanism. The forces carried by the looking mechanism may then be concentrated on just one or two of the teeth, causing those teeth to fail, followed by sequential failure of all the remaining teeth as the load is transferred to them (the so-called "domino effect").

It is an object of the present invention to provide a pivot mechanism that mitigates at least some off the disadvantages of prior art pivot mechanisms.

According to one aspect of the present invention the is provided a pivot mechanism including a first element, a second element that is rotatably mounted an the few element via a pivot means, and a locking mechanism including a convex tooth segment provided on the second element and a locking member having a concave tooth segment, the locking member being mounted on the first element for movement between a locked position in which the convex and concave tooth segments are engaged preventing rotation of the second element and an unlocked position in which the tooth segments are disengaged; characterised in that the center of curvature of the convex tooth segment is offset from the center of curvature of the concave tooth segment whereby, in normal usage, the convex and concave tooth segments are only partially engaged when the locking member is in the locked position.

Owing to the offset of the centers of curvature, the mechanism is able to absorb some plastic deformation without failing. The deformation has the effect of driving more of the teeth into engagement, thereby spreading the load between the tooth segments and increasing the strength of the locking mechanism.

Advantageously, the point of engagement between the tooth segments is towards one end of the concave tooth segment, which in the case of a pivot mechanism for a vehicle seat is the rear end of the tooth segment, This gives the mechanism greater strength in one direction than the other, which is important in situations where the pivot mechanism is more likely to encounter very large loads in one direction than another, for example in a vehicle that is involved in a collision. In many communities, these load in characteristics are dictated by legislation. The off-center location of the engagement point also serves to remove free play from the mechanism and compensates automatically for both tolerance and wear.

The degree and direction of offset depends on the design criteria including the balance of the strength requirements for loads acting in different directions on the mechanism, and the dimensions and load-bearing characteristics of the other components of the mechanism.

Advantageously, the effective radius of the concave tooth segment is larger than the effective radius of the convex tooth segment. The ratio of the effective ratio may be in the range 1.0–1.3, preferably 1.1–1.2, more preferably approximately 1.15.

Advantageously, the centers of curve of the convex and concave tooth segments are located on a line that is substantially radial to both tooth segments, and said line insects the concave tooth segment towards one end thereof which in the case of a pivot mechanism for a vehicle seat is rear end of the tooth segment.

Advantageously, the pivot mechanism includes a cam element that engages the locking member and is constructed and arranged to control movement thereof between said locked and unlocked positions, said cam element including a fist cam surface for driving the locking member towards the locked position and a second cam surface for driving the locking member towards the unlocked position.

According to a further aspect of the invention there is provided a pivot mechanism including a first element, a second element that is rotatably mounted on the first element via a pivot means, and a locking mechanism including a convex tooth segment provided on the second element a locking member having a concave tooth segment the locking member being mounted on the first element for movement between a locked position in which the convex and concave tooth segments are engaged preventing rotation of the second element and an unlocked position in which the tooth segments are disengaged, and a cam element that engages the locking member and is constructed and arranged to control movement thereof between said locked and unlocked positions; characterised in that the cam element includes a first cam surface for driving the locking member towards the locked position and a second cam surface for driving the locking member towards the unlocked position.

According to a further aspect of the invention there is provided a pivot mechanism including a first element, a second element that is rotatably mounted on the first element via a pivot means, a locking member having a first locking formation that complements a second locking formation provided on the second element the locking member being mounted for movement between a locked position in which the first and second locking formations are engaged, so preventing rotation of the second element, and an unlocked position in which the locking formations are disengaged, at least one guide member for guiding movement of the locking member and a control member for controlling movement of the locking member, characterised in that when the locking member is in the locked position the control member exerts on the locking member a force having a first component that acts in the direction of movement of the locking member and a second component acts perpendicular to said direction of movement.

When the mechanism is locked, the locking member is urged against the second element by the control member. The force acting upon the locking member has a first component that acts in the direction of movement of the locking member, which locks the second element in position, and a second component that is perpendicular to the direction of movement of the looking member, which urges the locking member against the guide member (or one of the guide members). This removes chuck (free play) from the mechanism and compensates for wear of the components.

Advantageously, the first and second locking formations engage one another at an engagement point P, which is offset from a line L that extends through the pivot axis of the pivot means in the direction of movement of the locking member.

Advantageously, the control member includes a rotatable cam and the first and second locking formations engage one another at an engagement point P, which is offset from a line that extends through the pivot axis of the pivot means and the rotation axis of the cam.

The pivot mechanism may have locking formations allowing the first and second elements to be locked in one or more positions.

According to a further aspect of the invention there is provided a pivot mechanism including a first element, a second element that is rotatably mounted on the first element via pivot means, a locking member having a first locking formation that complements a second locking formation provided on the second element, the locking member being mounted for movement between a looked position in which the first and second locking formations are engaged, so preventing rotation of the second element and an unlocked position in which the locking formation are disengaged, at least one guide member for guiding movement of the locking member and a control member for controlling movement of the locking member; characterised by a compensating element that urges the locking member against said at least one guide member to remove chuck from the mechanism.

The wedge member removes chuck (free play) from the mechanism and compensates for wear of the components.

Advantageously, the compensating element includes a wedge member that is urged into a gap adjacent the locking member. The wedge member may be urged into the gap by means of a spring.

According, to a further aspect of the invention there is provided a recliner mechanism for a vehicle seat having a seat base and a reclining seat back, said recliner mechanism including a pivot mechanism as described in one of the preceding statement of invention.

The recliner mechanism may include a look out mechanism for driving the locking member into engagement with the convex tooth segment in the event of a collision.

According to a further aspect of the invention there is provided a recliner mechanism for a vehicle seat having a seat base and a reclining seat back, said recline mechanism including a pivot mechanism that includes a pivot arm rotatably mounted on a base member via a pivot pin, and a locking mechanism including a convex tooth segment provided on the pivot arm, and a locking member having a concave tooth segment, the locking member being mounted on the base member for movement between a locked position in which the convex and concave tooth segments are engaged preventing rotation of the pivot arm and an unlocked position in which the tooth segment are disengaged, characterised by a lock out mechanism for driving the locking member into engagement with the convex tooth segment in the event of a collision.

According to a further aspect of the invention there is provided a vehicle seat including a seat base and a reclining seat back that is attached to the seat base by means of a recliner mechanism according to the preceding statement of invention.

Embodiments of the invention will now be described by way of example with reference to the accompanying drawings, in which:

FIG. 6a is a sectional front view at an enlarged scale, showing the pivot pin and sleeve of the first pivot mechanism;

FIG. 6b is a sectional front view showing the pivot pin of a modified pivot mechanism;

Figure 1:
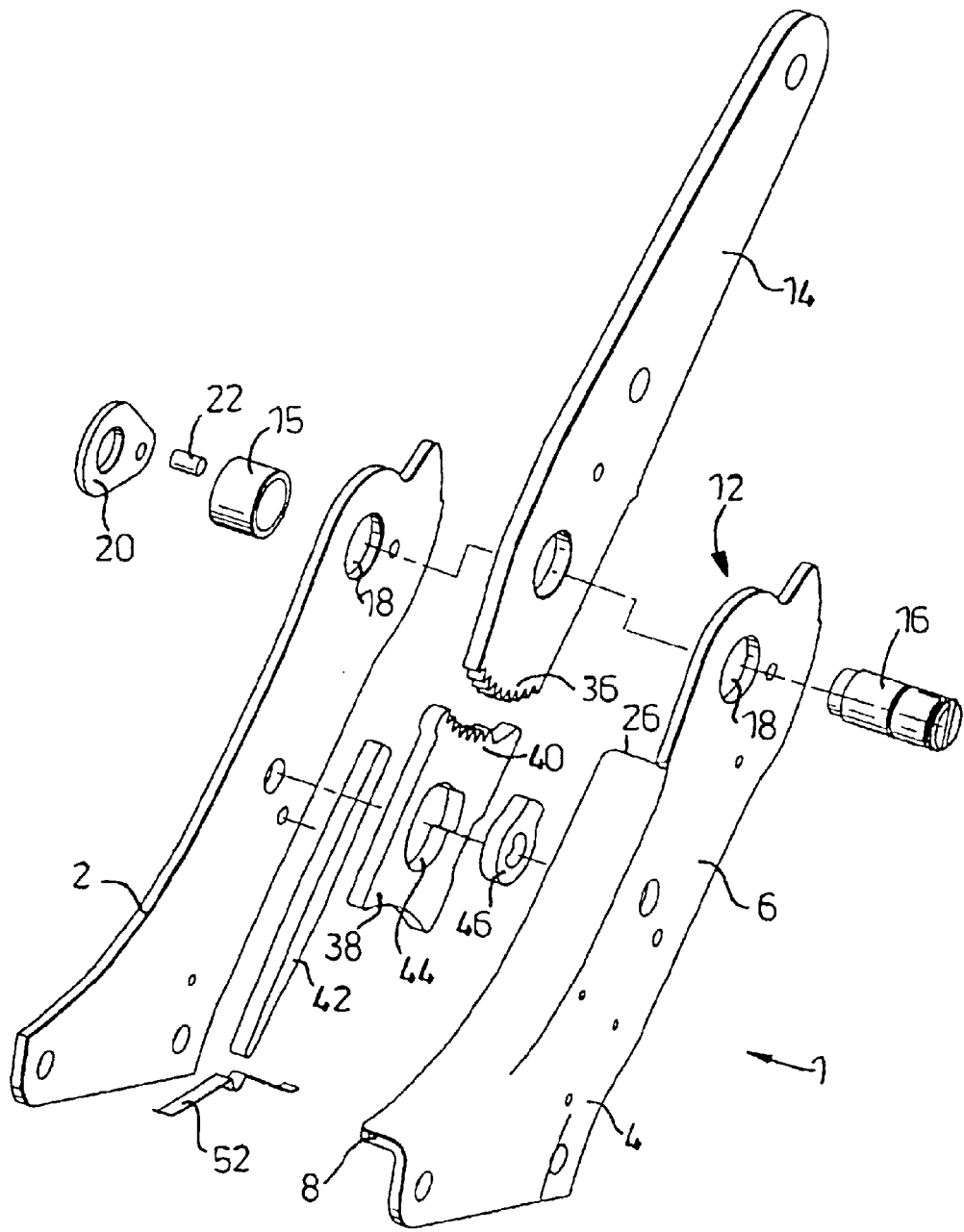
FIG. 1 is an exploded isometric view of a first pivot mechanism according to the invention.
Figure 2:
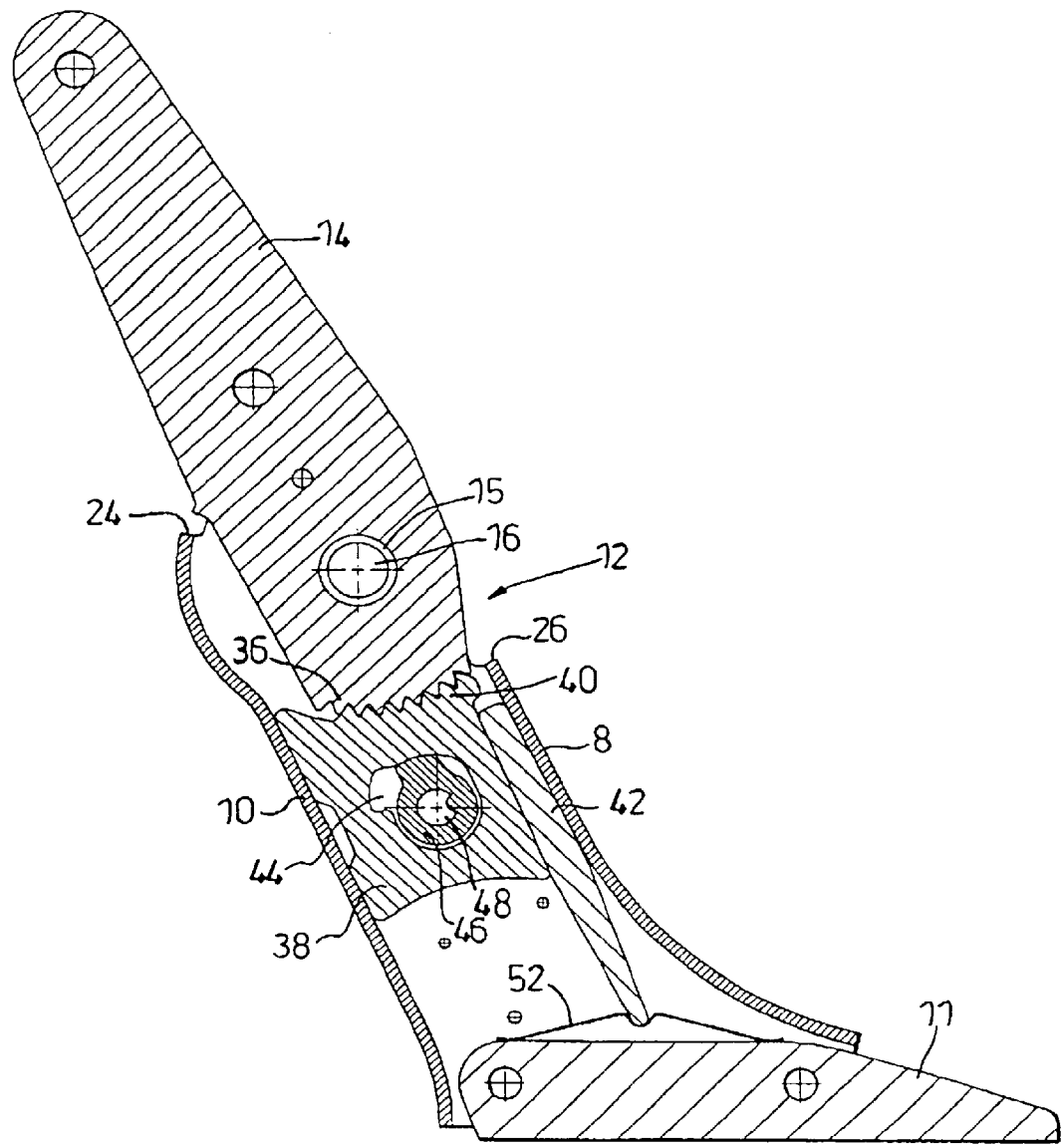
FIG. 2 is a sectional side view of the first pivot mechanism.

A pivot mechanism according to the invention is shown generally in FIGS. 1 and 2 of the drawing. The pivot mechanism is similar in most respects to the mechanism described in our British patent application No. 0104334.8, the content of which is incorporated by reference herein.

Each reclining vehicle seat may include two such pivot mechanism, which are interlinked and mounted on either side of the seat and join the reclining seat back to the seat base, preferably at the extremities (the widest point) of the seats. Alternatively, the seat may include a pivot mechanism as shown in the drawings on just one side and a plain pivot on the opposite side. In practice, the mechanism will normally be covered, either by the upholstery of the seat or by a rigid cover.

The pivot mechanism includes a housing 1 formed from two steel plates, hose being a flat closing plate 2 and a pressed plate 4 that has a shallow U-shaped cross-section, comprising a substantially flat side plate 6 and front and rear peripheral walls 8,10 that extend towards the flat closing plate 2. The plates 2,4 are welded together along the free edges of the peripheral walls 8,10 forming a very strong box-section.

The housing 1 is roughly boot-shaped and is secured at its lower end (the sole of the "boot") to a mounting member 11 that is attached to one of the seat slides or to the seat base. The housing 1 is thus fixed relative to the seat base. Alternatively, the housing 1 may be attached direct to tho slide or seat base. Towards the upper end of the housing (at the knee of the "boot"), a gap is provided between front and rear peripheral walls 8,10 forming an opening 12 into the housing.

A pivot arm 14 made of steel plate, which in use is attached to and supports the seat back, extends through the opening 12 and is mounted via a sleeve 15 on a pivot pin 16 that extends through the housing and is located in corresponding opening 18 in the side plates 2,4. The sleeve 15, which serves as a stress relief bush and is described in more detail below, may be omitted if not required.

One end of the pivot pin 16 is welded or fixed to a pin head 20, which is secured to the side plate 2 by a reaction pin 22 to prevent rotation of the pivot pin. This mounting method avoids welding onto the side plate 2 and thus avoids compromising the material integrity of the plate, ensuring maximum housing strength. It also allows the pivot pin 16 to be demounted.

Pivoting movement of the pivot arm 14 about the pin 16 is limited by engagement of the arm with the front and rear peripheral walls 8,10 at the edges of the opening 12. Thus, rewards or reclining movement is limited by the arm engaging a first stop surface 24 on the rear peripheral wall 10, and forwards or tipping movement of the arm is limited by the arm engaging a second stop surface 26 on the front peripheral wall 8.

A clock spring (not shown) may be mounted on the second end of the pivot pin 16 that extends outwards beyond the housing 1. The spring is connected to the pivot arm 14 and biasses the seat back towards an upright position from a reclined position.

The pivot arm 14 may be locked in a number of different reclined positions by means of a locking mechanism. A first set of teeth forming a convex tooth segment 36 is provided at the lower end of the pivot arm 14. A locking member 38 comprising a metal plate having a second set of teeth forming a concave tooth segment 40 is located below the pivot arm and mounted for up and down sliding movement within the housing 1, between the rear peripheral wall 10 and a glide block 42, which is located between the locking member 38 and the front peripheral wall 8.

The locking member 38 has a central opening 44 that serves as a cam follower arrangement. This opening encloses and is engaged by a rotatable cam element 46. The cam element 46 is mounted on a second pivot pin 48 that extends through the housing 1.

When the cam element 46 is in the position shown in FIG. 2, the concave tooth segment 40 on the locking member 38 is locked in engagement with the convex tooth segment 36 provided at the lower end of pivot arm 14, thereby preventing movement of the arm. To release the locking element, the cam element 46 is rotated from that position anticlockwise through an angle of approximately 90°. This draws the locking member 38 downward so that the concave tooth segment 40 disengages the convex tooth segment 36 on the pivot arm 14. The seat back can then be rotated to a different angle.

The average segment tooth angle for the two sets of teeth preferably lies in the range 50° to 75°, and is preferably approximately 60°. If the angle is less than 50° the teeth may be too weak to withstand the stresses placed upon them, particularly in the event of a collision, whereas if the angle is greater than 75° the forces tending to push the sets of teeth apart when the mechanism is loaded may be too large to be contained by the housing.

The front and rear peripheral walls 8,10 converge upwards at a small angle of convergence, and the glide block 42 is wedge-shaped having front and rear surfaces that converge upward at the same small angle. The inner face of the glide block 42 is therefore parallel to the rear peripheral wall 10. This allows the locking member 38 to slide between those surfaces, movement of the locking member 38 being guided by the rear peripheral wall 10 and the rear surface of the glide block 42.

The glide block 42 is capable of siding movement relative to the housing 1 and is biassed upwards by a leaf spring 52 that sits on the upper edge of the mounting member 11. This produces a wedging action, which ensures at there is no fore-and-aft chuck (free play) in the mechanism. The glide block thus serves as a compensating element that compensates automatically for wear of the components and prevents judder and rattle.

Figure 3A:
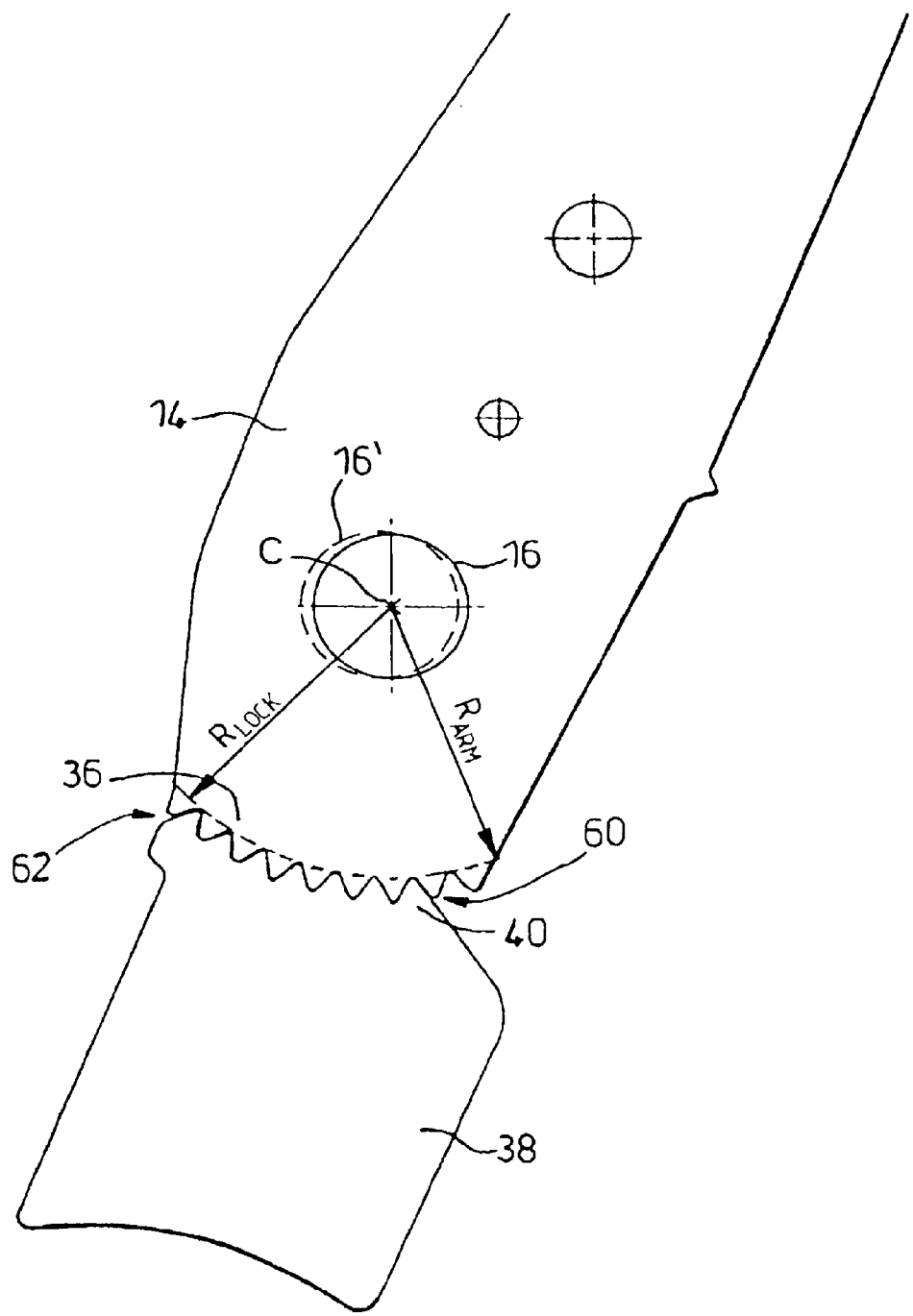
FIGS. 3A and 3B are partial schematic side views of a prior art pivot mechanism, before and after deformation.

FIG. 3A of the drawing shows schematically the pivot mechanism described in our earlier British patent application No. 0104334.8. The radius of curvature $R_{arm}$ of the convex tooth segment 36 provided at the lower end of the pivot arm 14 is exactly matched to the radius of curvature $R_{lock}$ of the concave tooth segment 40 provided on the locking member 38, and both tooth forms have the same center of curvature C. As a result the two sets of teeth mesh perfectly, providing theoretically the highest possible load bearing capacity.

Figure 3B:
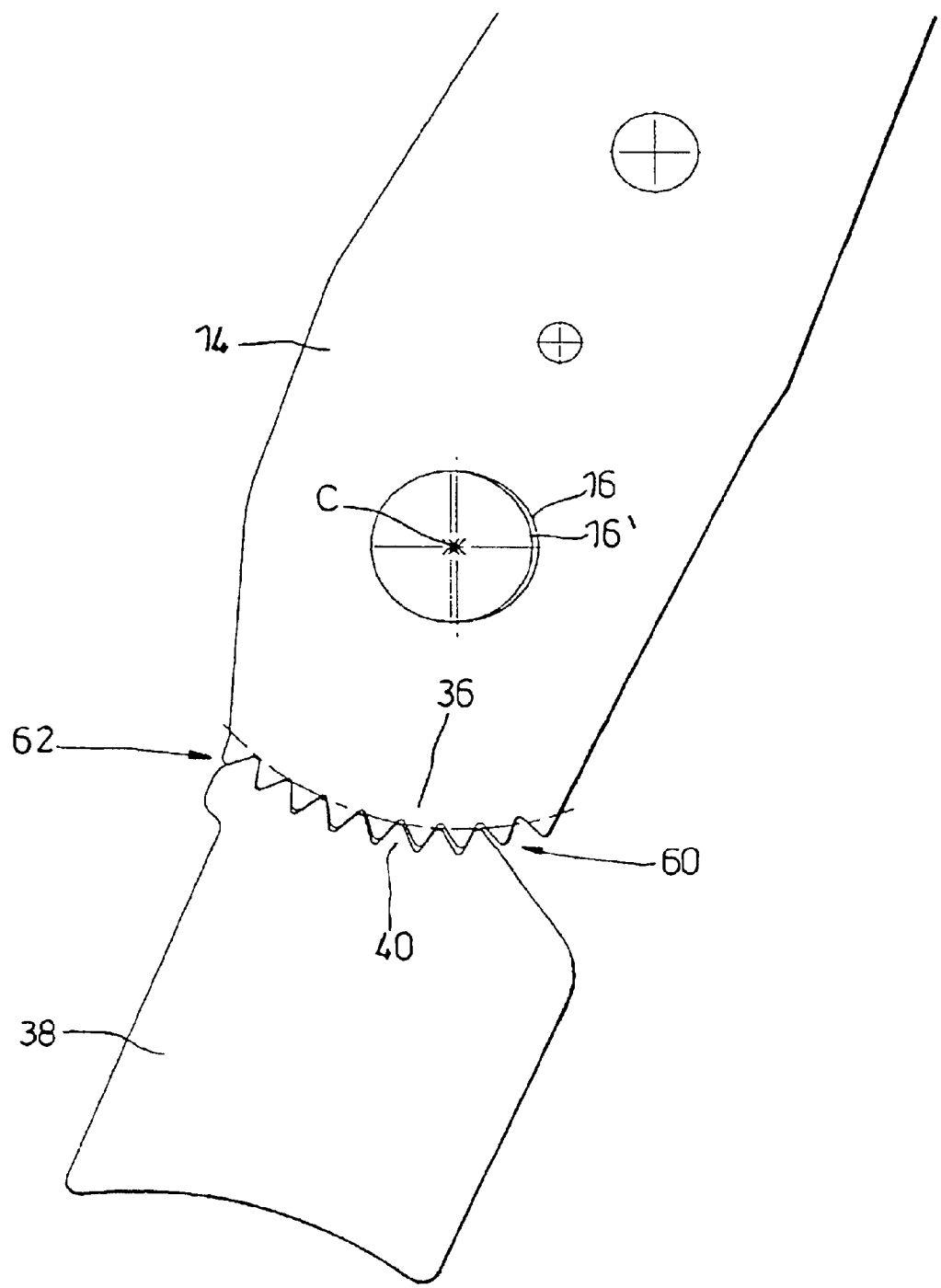

We have found that in the event of a frontal collision, the pivot mechanism can experience plastic deformation, owing to the very high transient forces transmitted through it from the inertial loading of a passenger secured to the seat back by a seat belt, or luggage stowed behind the seat back. Typically, as the mechanism is deformed, the holes 18 in the housing become elongated allowing the pivot pin 16 to move forwards from its original position 16 to a new position 16' shown in broken lines. This causes the tooth segments 36,40 to separate slightly, leaving a small gap between the two tooth segments at the rear edge 60 of the mechanism, as shown in FIG. 3B.

As a result of this deformation, the teeth towards the rear edge 60 of the tooth segments may no longer fully engage each other. The entire load will therefore be borne by one or two at the front edge 62 of the tooth segments, rather than being spread evenly over the whole length of the two tooth segments. If that load is too great for the front teeth to bear, they will deform and fail. The load will then be transferred to the next teeth, which may also deform and fail, and this process may continue, leading to sequential failure of all the teeth and collapse of the entire locking mechanism.

Figure 4:
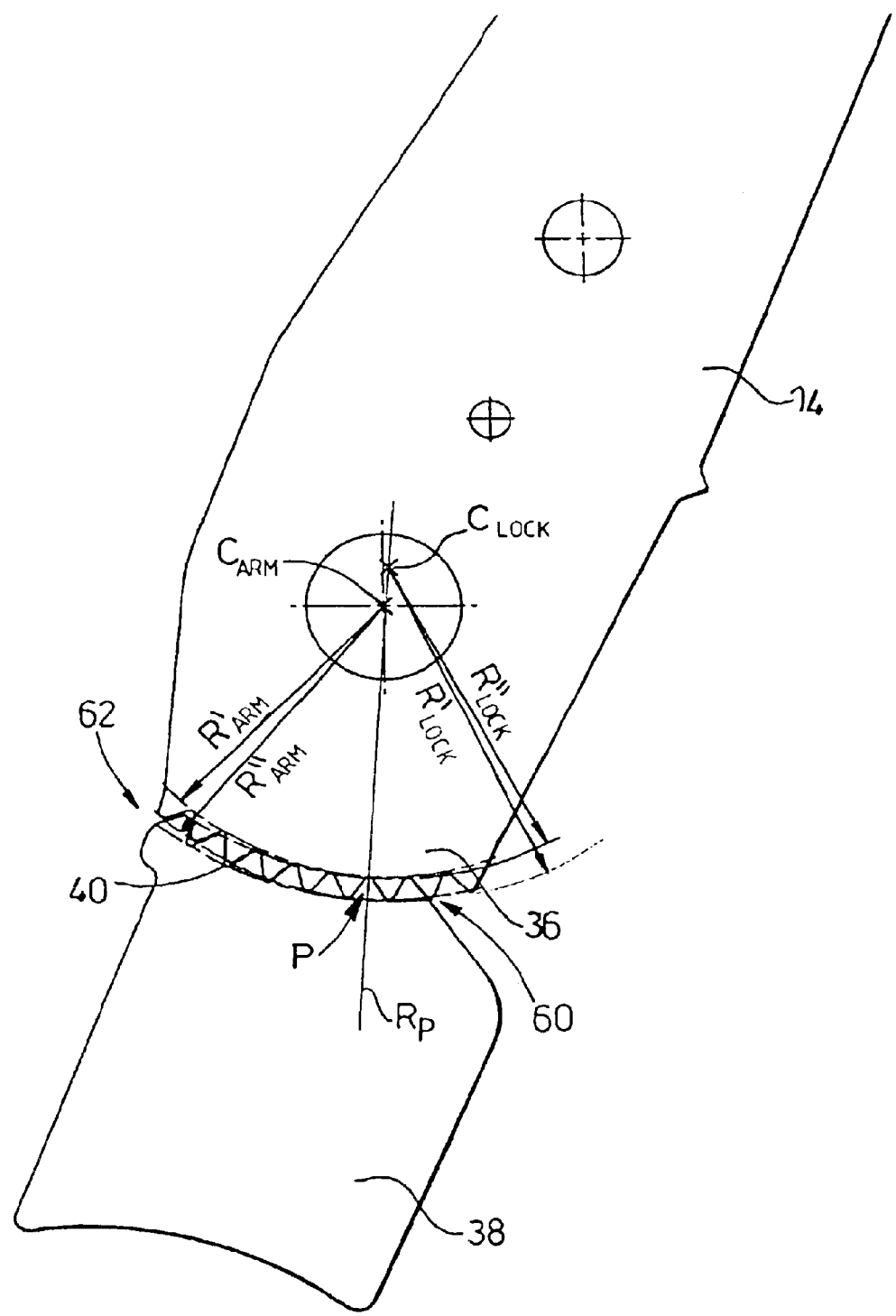
FIG. 4 is a partial schematic side views of the first pivot mechanism.

In the present invention, this problem is avoided by using a modified tooth form, as shown in FIG. 4. In this modified tooth form, the radii of curvature of the two tooth segments are not matched, and the centers of curvature of the tooth segments are offset from one another.

The curvature of a tooth segment may be defined in terms of its effective radius (R*), which is normally equal to the mean of the inner and outer tooth radii, measured from the center of curvature C to the roots and the tips of the teeth: i.e., $$R^* = (R' + R'')/2$$

where R'=the radius of curvature to the tooth roots and R"=the radius of curvature to the tooth tips.

In the example shown in FIG. 4, the effective radius of the convex tooth segment 36 on the arm 14 is slightly less than the effective radius of the concave tooth segment 40 on the locking member 38: i.e., $$R^*_{arm} < R^*_{lock}$$

where $R^*_{arm}$ is the effective radius of the arm 14 and $R^*_{lock}$ is the effective radius of the locking member 38.

Typical values for these radii are as follows:

Arm: $R'_{arm}$=43.07 mm, $R''_{arm}$=46.8 mm, $R^*_{arm}$=44.94 mm

Locking member: $R''_{lock}$=49.63 mm, $R'_{lock}$=53.45 mm, $R^*_{lock}$=51.54 mm In this case, the ratio of the effective radii ($R^*_{lock}/R^*_{arm}$) is equal to approximately 1.15. It will be appreciated however that the radii in any particular case will depend on the specified load bearing requirement and the dimensions and structure of the other components of the mechanism.

To accommodate the different effective radii, the centers of curvature are offset, the center of curvature $C_{arm}$ of the convex tooth segment 36 being located closer to the teeth than the center of curvature $C_{lock}$ of the concave tooth segment 40. The radial separation of the two center of curvature is equal to the difference between the effective radii, so that the teeth mesh correctly at one point referred to herein as the "engagement point" P.

Preferably, in forward-facing set applications, the engagement point P is located in the rear half of the locking member 38, between the center of the concave tooth segment 40 and its rear edge 60. For example, a shown in FIG. 4a, the engagement point P may coincide with the second tooth from the rear edge of the concave tooth segment 40. The centers of curvature of the arm $C_{arm}$ and the locking member $C_{lock}$ are therefore located on a radius $R_F$ that intersects the tip of that tooth.

Figure 5A:
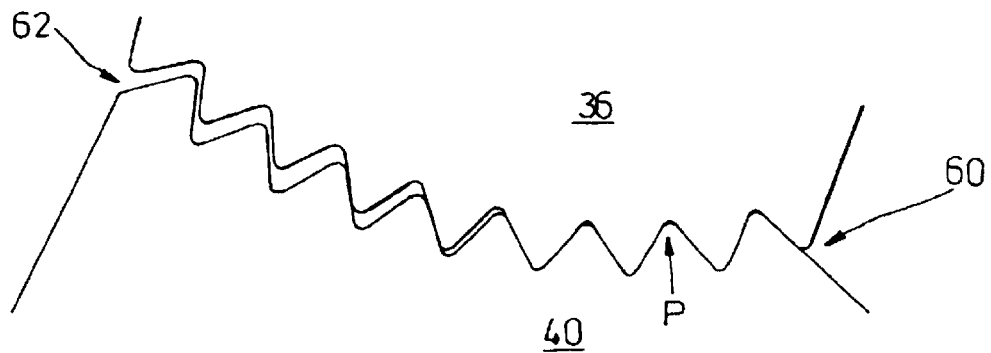
FIGS. 5a and 5b are enlarged partial schematic side views of the first pivot mechanism, showing the mechanism before and after a collision causing plastic deformation of the mechanism.

As shown more clearly in FIG. 5a, the two segments 36,40 mesh correctly at the engagement point P, but am not fully engaged forward and rearwards of that point, the gap between the tooth segments being larger at the front edge 62 of the locking member 38 than at the rear edge 60. Nevertheless, the engagement between the two segments is sufficiently strong to withstand the forces and wear encountered during normal usage.

Figure 5B:
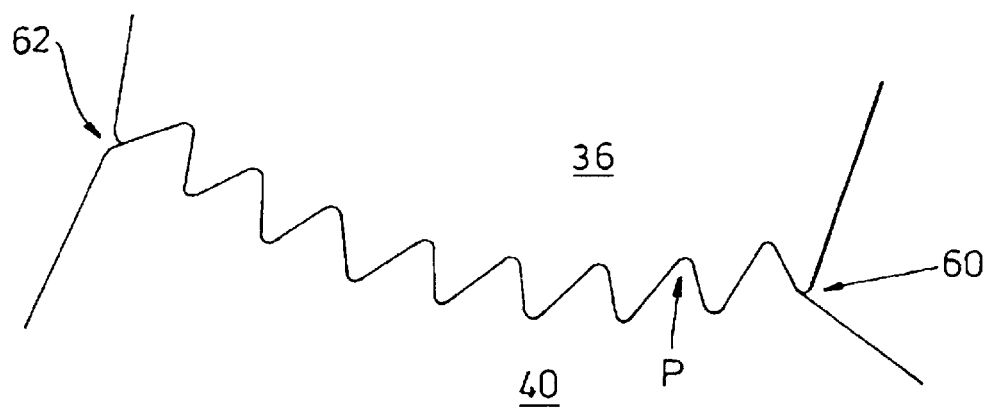

Should the vehicle be involved in a frontal collision, there may be some plastic deformation of the pivot mechanism, the result of which is shown in FIG. 5b. The pivot pin has been displaced forwards from its usual position and, as a result, tie teeth towards the front edge 62 of the pivot arm 40 have been brought into engagement with the corresponding teeth of the locking member 36, thereby increasing the number of teeth in contact. The forces are therefore shared between a increased number of teeth, so reducing the likelihood of the teeth failing. There has also been some deformation of the teeth around the original engagement point P, but this is not sufficiently serious to cause those teeth to fail.

The locking mechanism is therefore able to meet the specified load requirements more efficiently, and its strength increases with the severity of the crash. Testing has shown that the arrangement described above significantly increases the strength of the mechanism.

The sleeve 15 that surrounds the pivot pin 16 is shown in more detail in FIG. 6A. It extends through the housing plates 2,4 and the pivot pin 16 and is designed to relieve stress around the openings 18 in the housing plates, thereby reducing plastic deformation and increasing the strength of the mechanism. The sleeve 15 my however be omitted if not required, as shown in FIG. 6B.

Figure 7:
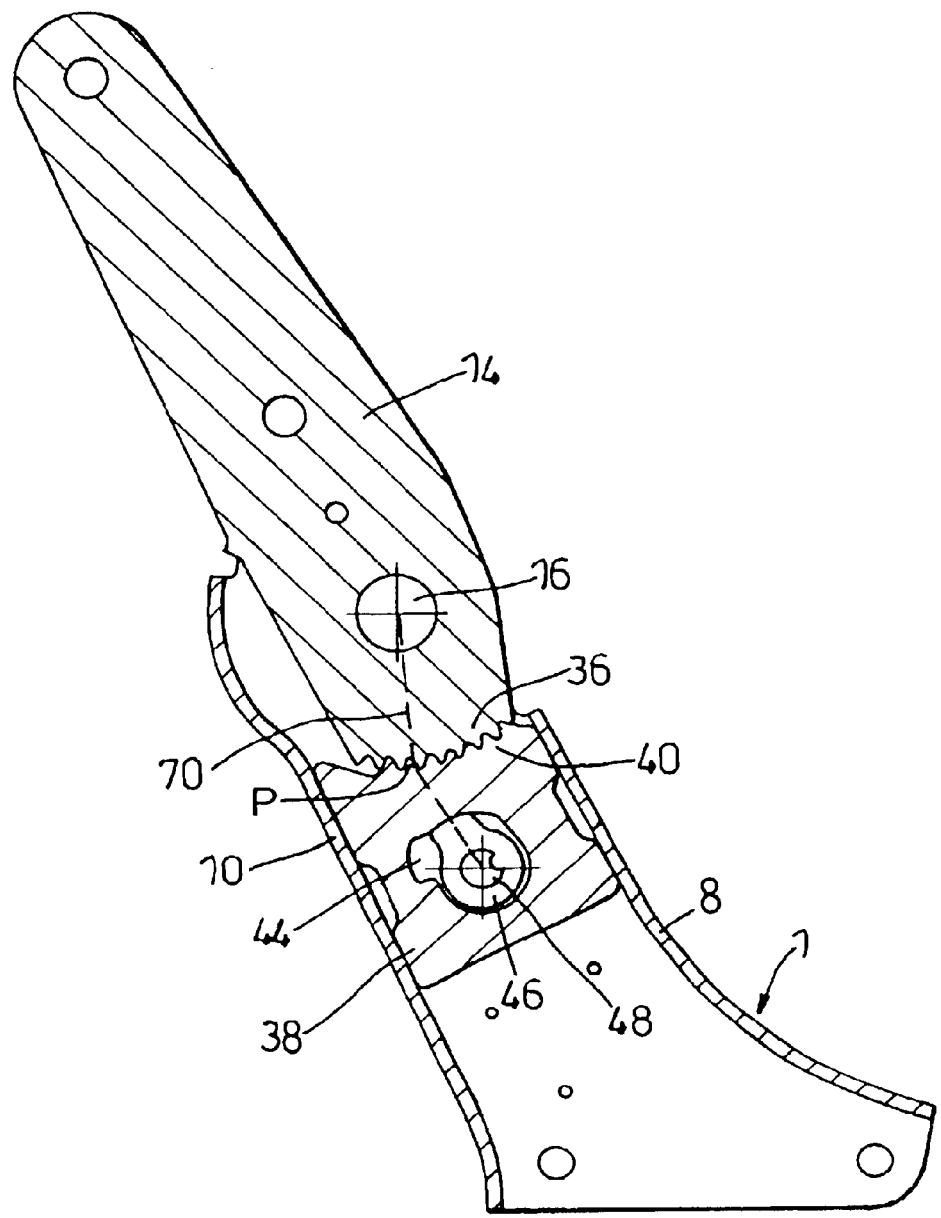
FIG. 7 is a sectional side view of a second pivot mechanism according to the invention.

A second embodiment of the invention is shown in FIG. 7. In this embodiment, the wedge-shaped glide block 42 is omitted and the locking member 38 is instead mounted for sliding movement between the front peripheral wall 8 and the rear peripheral wall 10.

As in the previous example shown in FIG. 4, the effective radius of the convex tooth segment 36 on the arm 14 is slightly less than the effective radius of the concave tooth segment 40 on the locking member 38, and the centers of curvature are offset, the centre of curvature of the convex tooth segment being located closer to the teeth than the centre of curvature of the concave tooth segment. In This example, the engagement point P coincides with the second tooth from the rear edge of the concave tooth segment 40. The two tooth segment 36,40 mesh correctly at the engagement point P, but are not fully engaged forward and rearwards of that point, the gap between the tooth segments being larger at the front edge of the locking member 38 then at the rear edge.

The locking member 38 has a central opening 44, which is engaged by a rotatable cam element 46, When the cam element is in the "locked" position shown in FIG. 7, it exerts an upwards force on the locking member, which is transmitted through the pivot arm 14 to the pivot pin 16. That force is transmitted trough the engagement point P, the direction of that force being shown by a broken line 70. The engagement point P does not lie on a straight line intersecting the axes of the pivot pin 16 and the cam element 46. Instead, the engagement point P is located in the rear half of the locking member, and the line 70 along which the compressive force is transmitted is therefore bent. The compressive force therefore generates a resultant force on the locking member 38 that presses it hard against the rear peripheral wall 10.

The effect of this resultant force is to remove any free play between the locking member and the housing 1. The mechanism therefore compensates automatically for both tolerance and wear, without the need for the sliding wedge member 42 of the first embodiment shown in FIGS. 1 and 2.

Various modifications of the invention are possible, some of which will now be described.

Although it is preferred that the radii of curvature of the two tooth segments are not matched, and the centers of curvature of the tooth segments are offset from one another, it may be sufficient in certain circumstances just to offset the centers of curvature, for example by moving the pivot point backwards, while maintaining the same radii of curvature for both tooth segment. This will create a small gap between the two tooth segment at the front edge of the locking member, which will close when the mechanism suffers plastic deformation in a collision.

Alternatively, the time effect may be achieved by using teeth of different sizes, so that they become fully engaged only when the mechanism is deformed owing to very high load forces.

Instead of the symmetrical teeth shown in the drawings, the tooth segments may be provided with asymmetric (saw tooth) teeth, so that they can withstand a greater force in the forward direction without separation than in the rearward direction. This increases the ability of the mechanism to survive a serious frontal collision without collapsing.

In the mechanism shown in the accompanying drawings, the locking member 38 is located in the housing 1 that is a attached to the seat base and the pivot arm 14 is attached to the seat back. It should however be understood that the mechanism may be inverted, so that the pivot arm 14 is attached to the seat base and the housing 1 is attached to the seat back. The pivot arm 14 will then remain stationary whilst the housing 1 and the locking member 38 rotate with the seat back about the axis of the pivot pin 16. This arrangement may be preferred when, for example, a control handle for operating the cam element 48 is to be located at the top of the seat back rather than on the seat base.

Instead of a box section, the housing 1 may for example comprise two flat plates joined together with rivets, a single plate or a frame to which the other components are attached, or a flattened tube. The cam element 48 may be located in other positions, for example beneath the locking member 38. Instead of two guide members, a singe guide member may be provided that controls movement of the locking member. Further, the mechanism may be made from different materials, including other metals and metal alloys, plastics materials and composite materials.

Although the pivot mechanism is particularly suited to use in a seat recliner mechanism, it is not restricted to that use. It may also be used in various other mechanisms and industries including, for example, work benches, cranes, gearboxes, nano-mechanisms, mechanism counting devices, clock and watch mechanisms, inertia locking systems, brake or clutch compensating mechanisms and any other ratchet applications where two centres try to move apart when subjected to a load.

FIG. 8*a* to 8*e* illustrate the cam and cam follower structure of a third pivot mechanism according to the invention. The locking member 38 has a central opening 144 that serves as a cam follower arrangement. This opening encloses and is engaged by a rotatable cam element 146. The cam element 146 is mounted on the second pivot pin 48 that extends through the housing 1.

The shapes of the cam element 146 and the opening 144 that forms the cam follower are more complicated than in the previous embodiment, and are illustrated best by the drawings. It should be noted that the cam element 146 includes first and second cam surface 150*a*, 150*b* that engage respectively first and second cam follower sources 152*a*, 152*b* of the opening 144. The first cam and cam follower surfaces 150*a*, 152*a* are located generally in the upper parts of those components and serve, in use, to drive the locking member upwards into a locked position, whereas the second cam and cam follower surfaces 150*b*, 152*b* are located generally in the lower parts of those components and serve, in use, to drive the locking member downwards into an unlocked position.

Figure 8A:
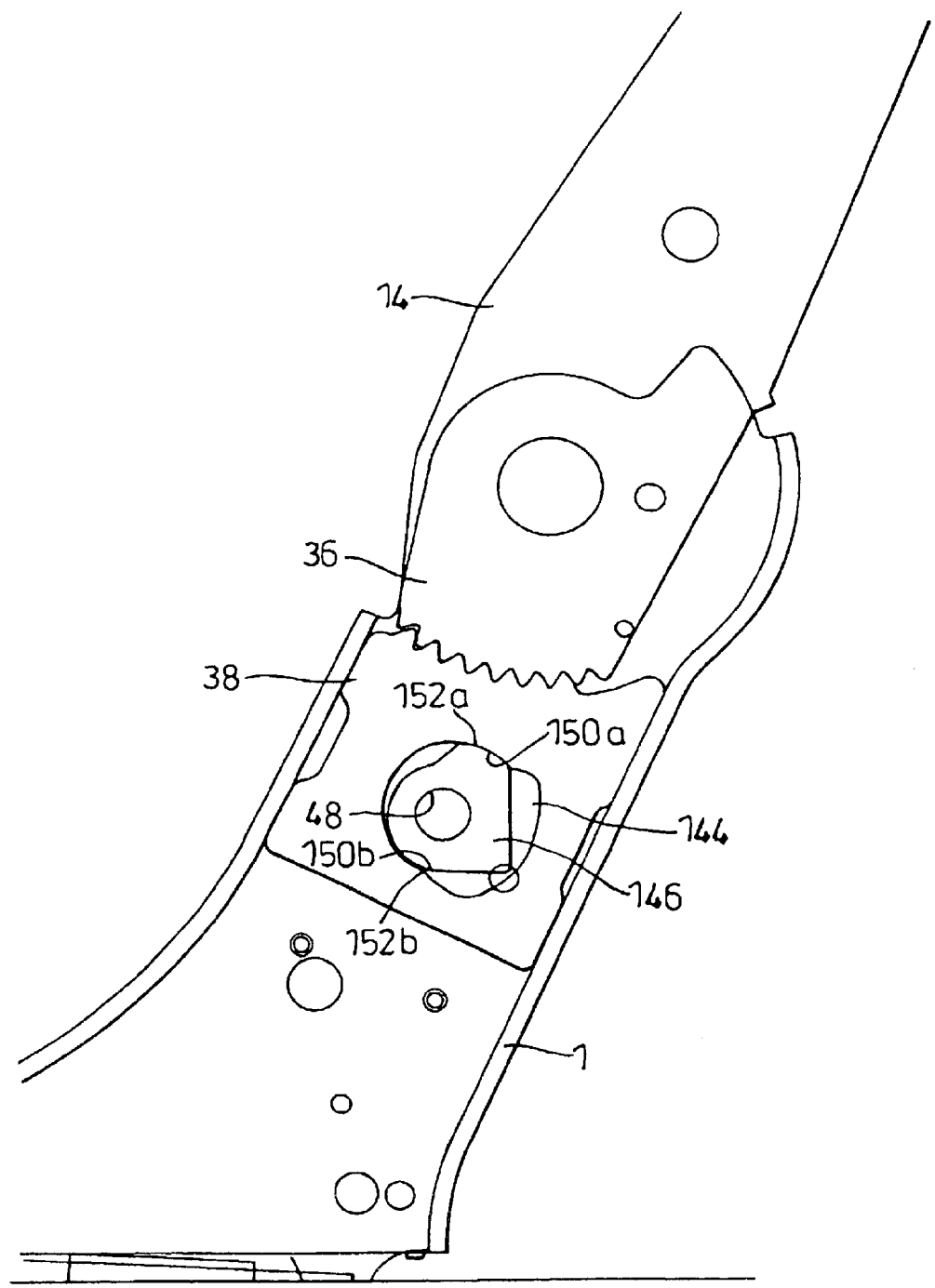
FIGS. 8a to 8e illustrate the cam and cam follower structure of a third pivot mechanism according to the invention.
Figure 8B:
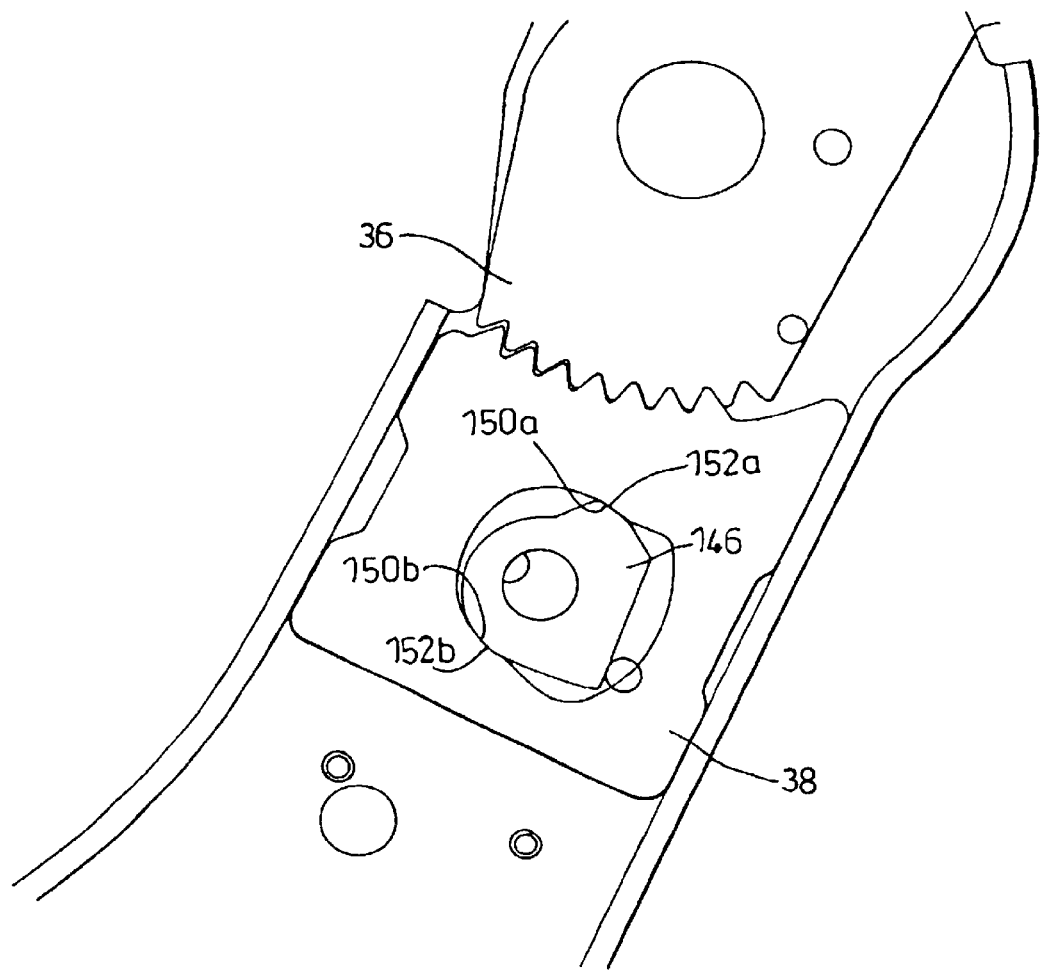
Figure 8C:
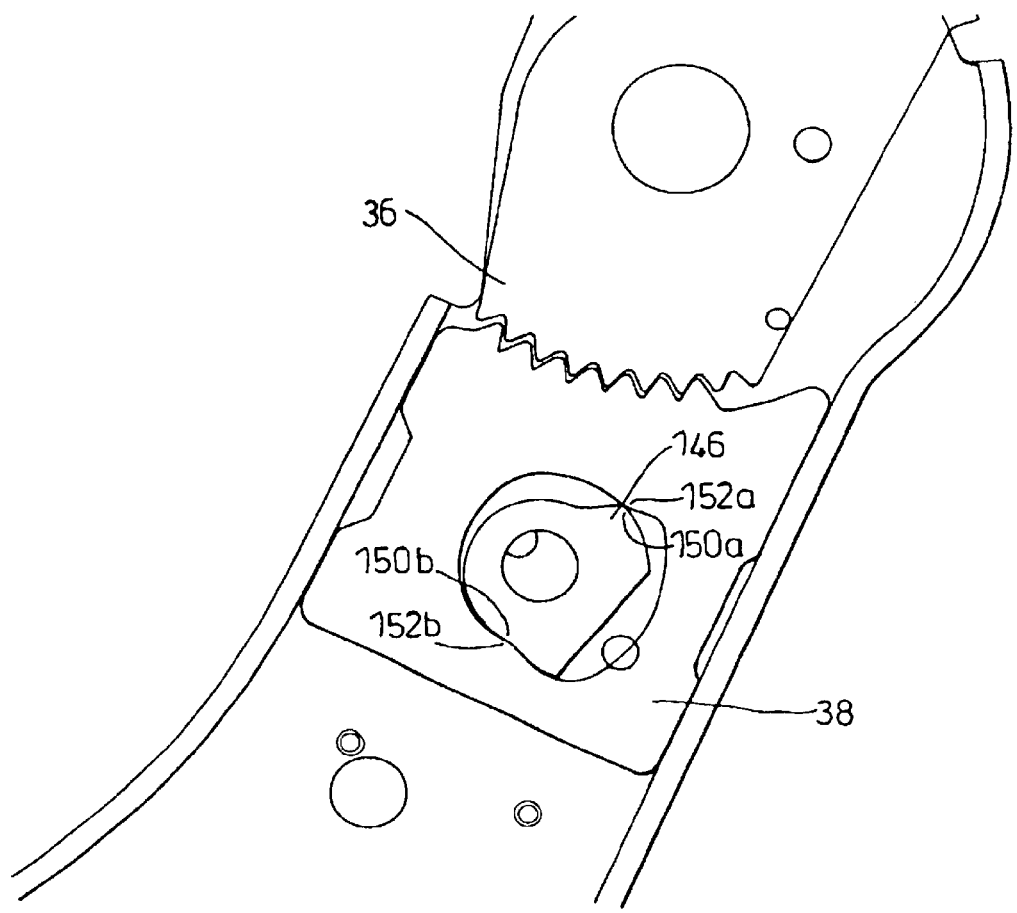
Figure 8D:
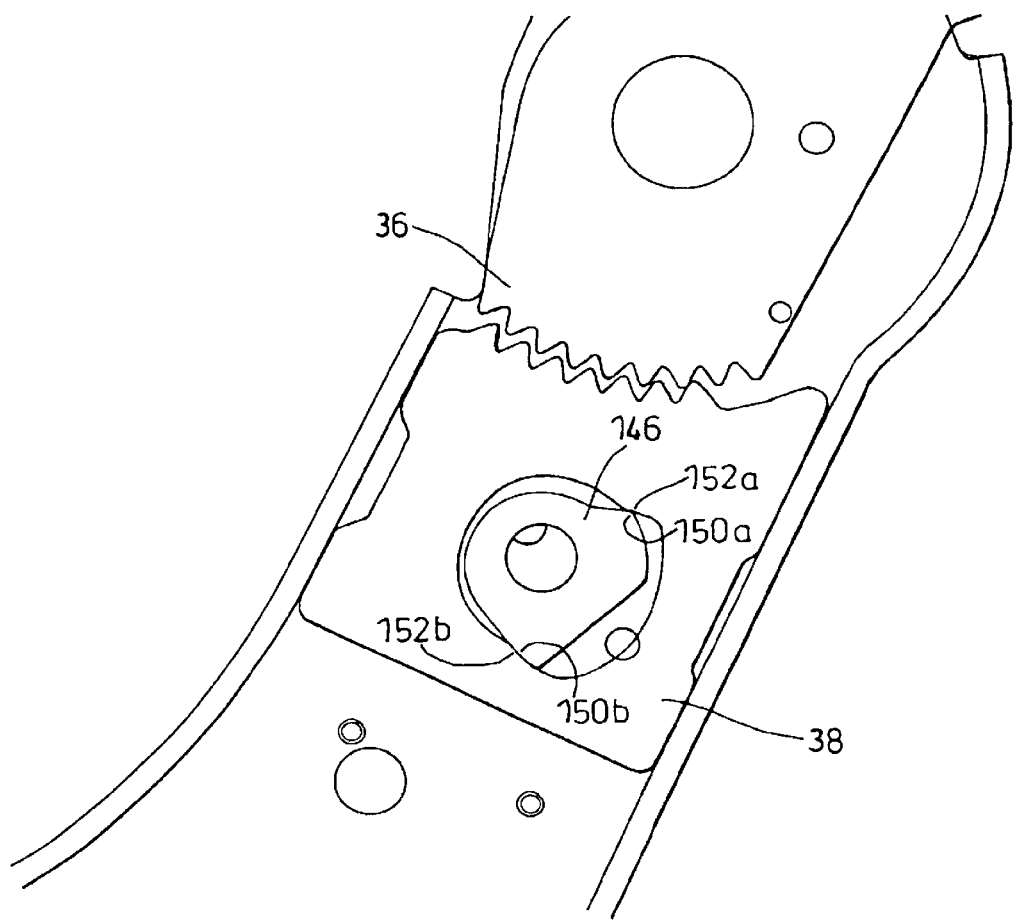
Figure 8E:
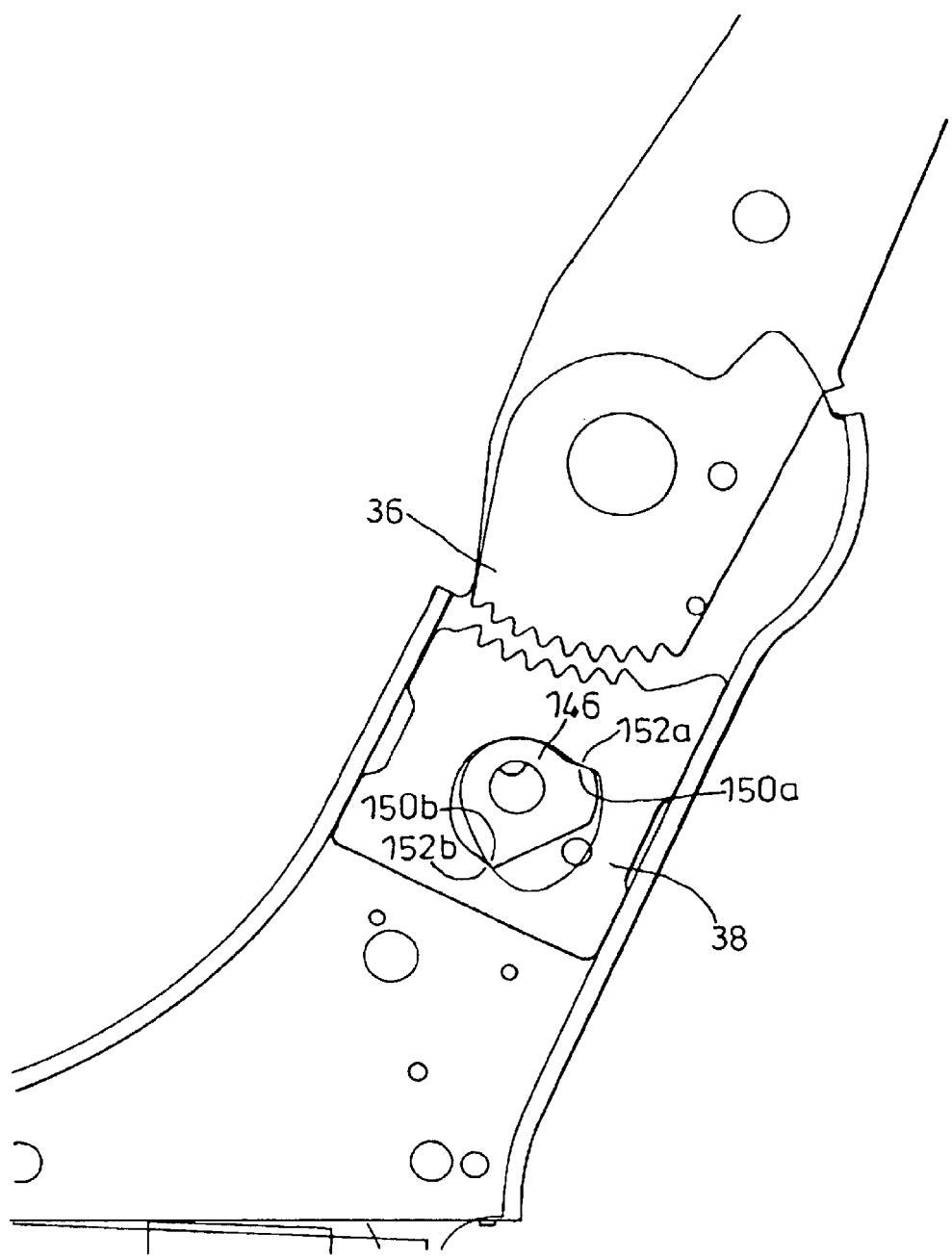

The movement of the cam element 146 and the resulting movement of the locking member 38 is illustrated sequentially in FIGS. 8*a* to 8*e*. In FIG. 8*a*, the upper parts of the first cam and cam follower surfaces 150*a*, 152*a* are fully engaged, thereby urging the locking member 38 upwards into a locked position against the convex tooth segment 36 at the lower end of the pivot arm 14. In FIG. 8*b*, the cam element 146 has been rotated a few degrees in the clockwise direction, reducing the pressure of the locking member 38 against the convex tooth segment 36. In each of FIGS. 8*c*, 8*d* and 8*e*, the cam element 146 has been rotated a few more degrees in the clockwise direction, thereby disengaging the locking member 38 from the convex tooth segment 36. It will be noted that in each of these positions, both the upper and the lower cam and cam follower surfaces 150*a,b* 152*a,b* are engaged and movement of the locking member 38 is therefore fully controlled, and here is no lost motion in the mechanism.

FIGS. 9 to 14 illustrate various forms of a lock out mechanism of a fourth pivot mechanism according to the invention. The lock out mechanism serves to increase the pressure of the locking member 38 against the convex tooth segment 36 in the event of a collision, to reduce the possibility of the mechanics disengaging.

Figure 9:
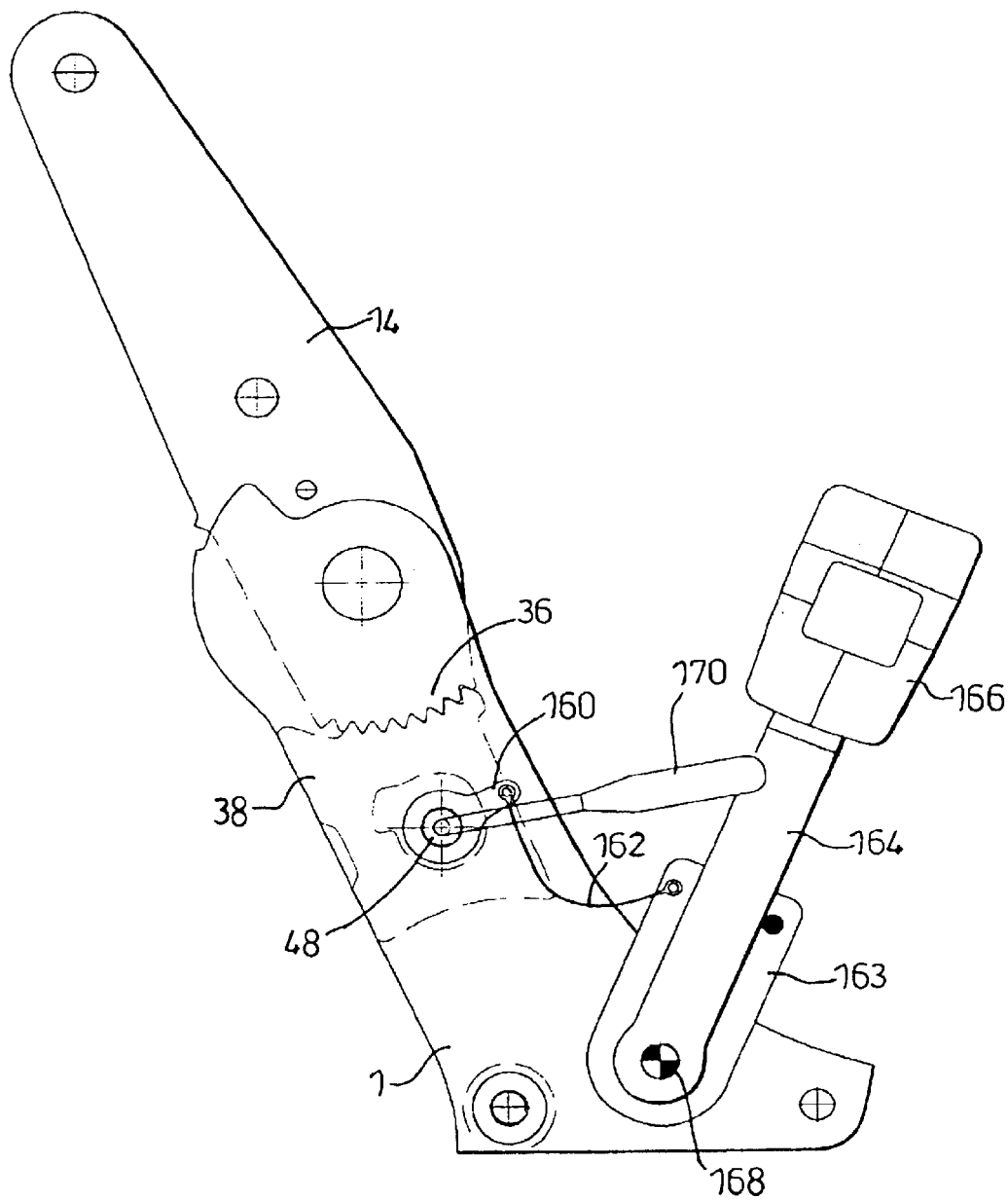
FIGS. 9 to 14 illustrate various forms of a lock out mechanism of a fourth pivot mechanism according to the invention.
Figure 10:
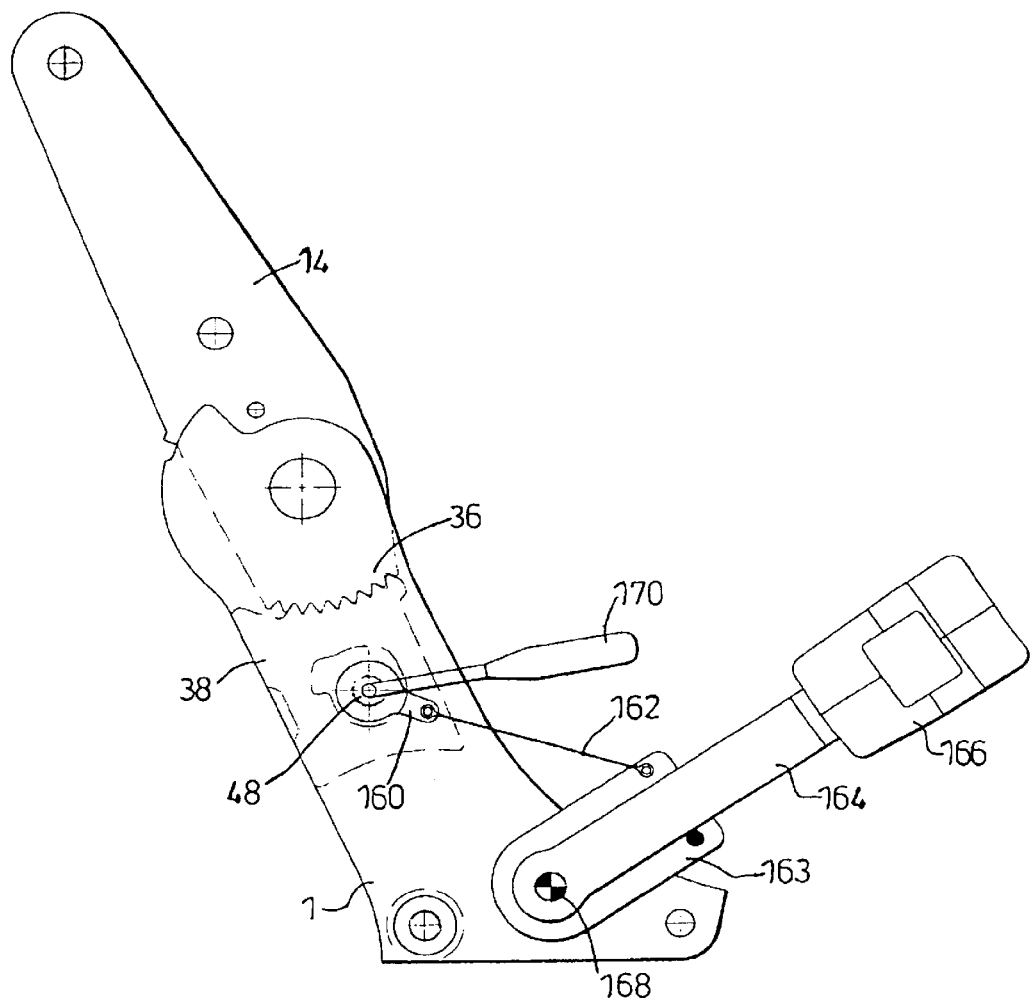

FIGS. 9 and 10 illustrate a first form of the lock out mechanism, which is activated by movement of the seat belt buckle. In this mechanism, the cam element (not shown) that controls movement of the locking member 38 is connected through the second pivot pin 48 to an operating arm 160. This arm is connected through a short wire cable 162 to a carrier plate 163 that engages the support arm 164 of a seat belt buckle 166, which is attached to a seat belt attachment point 168 on the side of the housing 1. The carrier plate 163 is constructed and arranged to move with the support arm 164, without affect either the arm or the seat belt attachment point 168. A release handle 170 is also connected to the pivot pin 48 and may be operated manually to release the locking member 38. The cable 162 is normally slack, to allow anti-clockwise rotation of the operating arm 160 when the release handle 170 is operated.

In the event of a frontal collision, the buckle support arm 164 will normally rotate clockwise under the load resulting from the inertia of a passenger sitting in the seat from the original position shown in FIG. 9 to the rotated position shown in FIG. 10. This snatches the cable 162 tight, drawing the operating arm 160 in a clockwise direction to the position shown in FIG. 10 and driving the locking member 38 against the convex tooth segment 36 of the pivot arm 14, to reduce the possibility of the mechanism disengaging.

Figure 11:
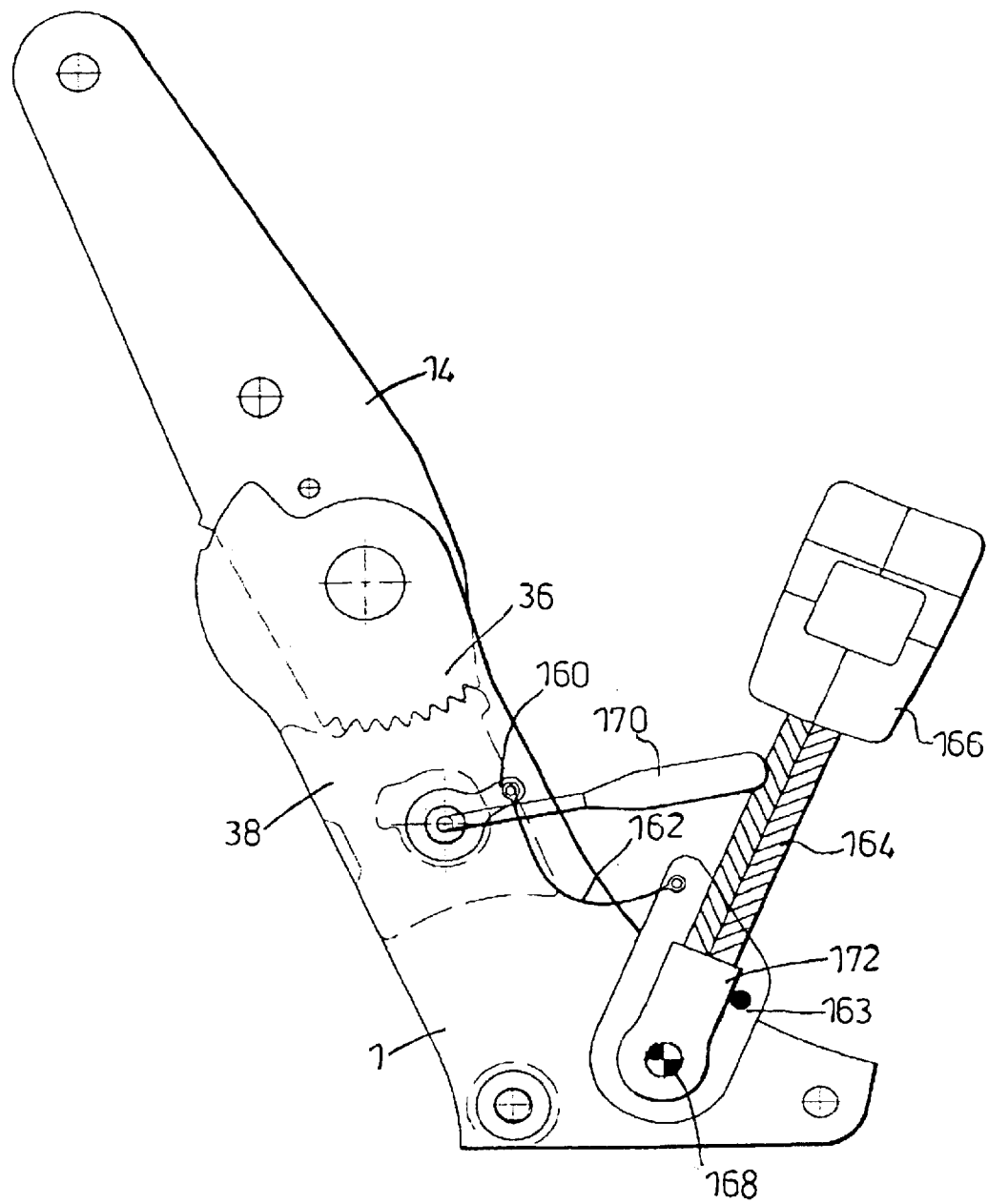
Figure 12:
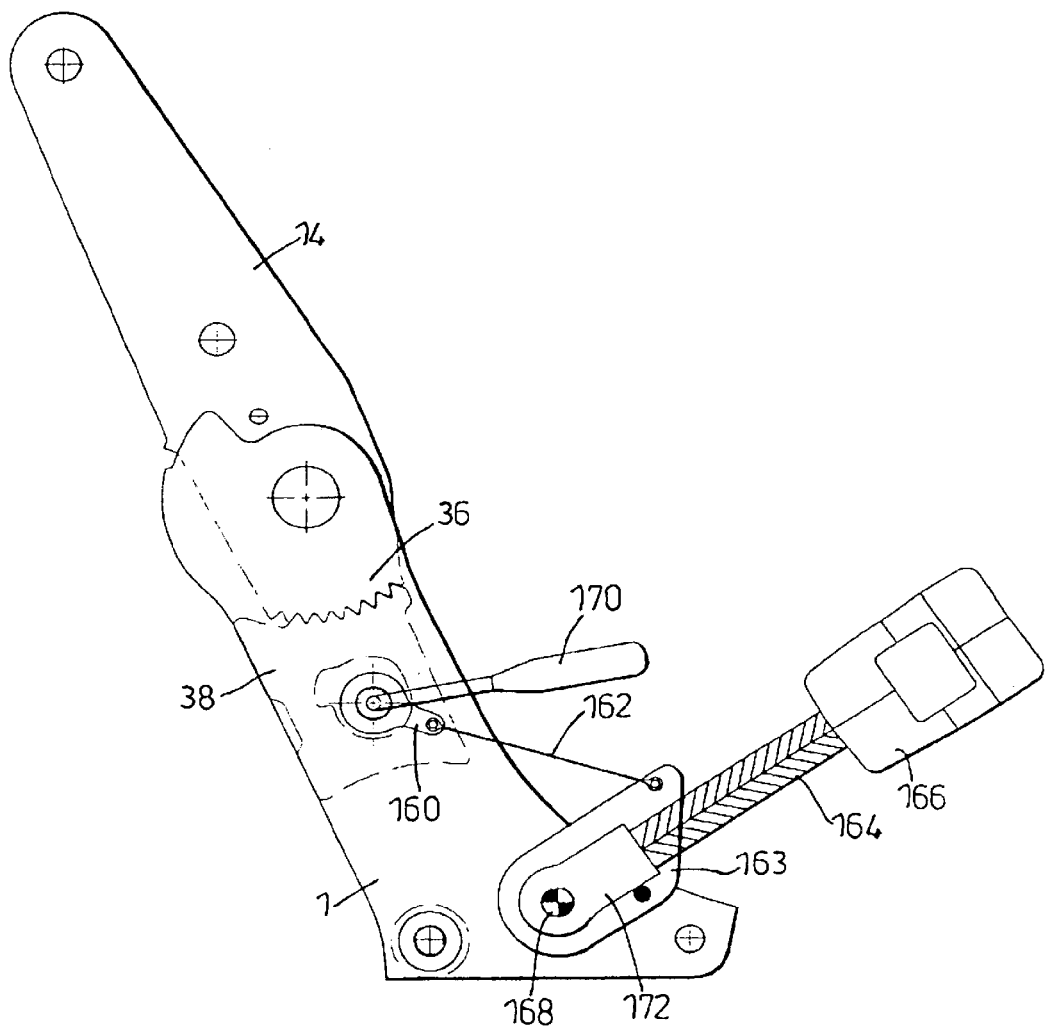

FIGS. 11 and 12 illustrate an alternative form of the lock out mechanism, in which the seat belt buckle 166 has a wire support arm 164. The cable 162 is attached to a modified carrier plate 163 hat engages a rigid sheath 172 at the lower end of the buckle support arm 164 without affecting either the arm or the seat belt attachment point 168. Operation of the mechanism is the same as that of the first mechanism shown in FIGS. 9 and 10. The positions of the various components of the lock out mechanism after a frontal collision has taken place and the mechanism has been actuated are illustrated in FIG. 12.

Figure 13:
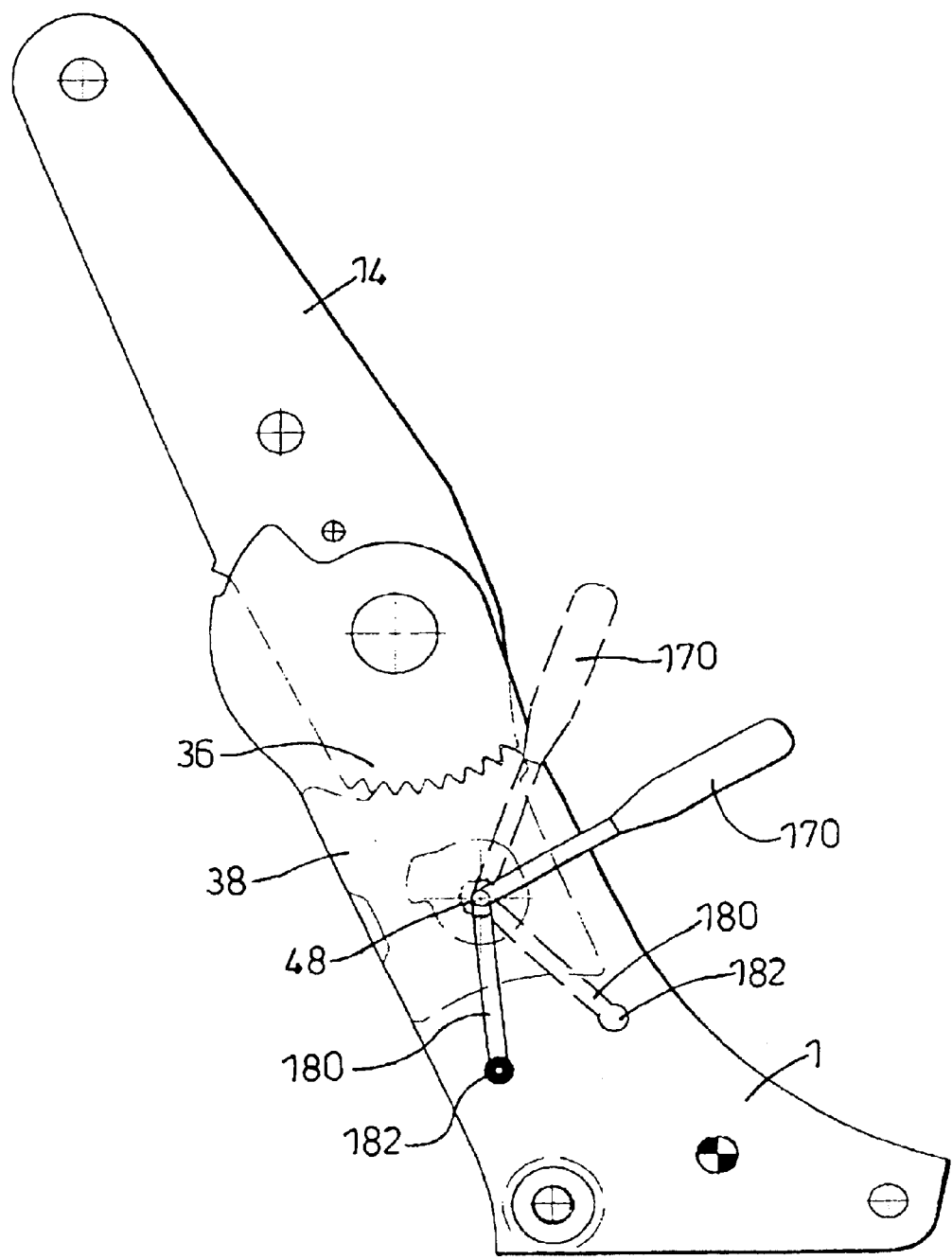

A further lock out mechanism that is actuated in the event of a rear collision is shown in FIG. 13. The lock out mechanism includes a pendulum 180 having a heavy bob 182, which is connected through the second pivot pin 48 to the cam element (not shown) that controls movement of the locking member 38. The release handle 170 is also connected to the pivot pin 48, the release handle being shown in its engaged position in full lines and in its disengaged position in broken lines.

Normally, the pendulum 180 is in the forward position shown in broken lines. However, in the event of a rear collision, the inertia of the bob 182 drives the pendulum 180 rearwards to the position shown in full lines, thereby driving the looking member 38 upwards against the convex tooth segment 36 and locking the mechanism.

Figure 14:
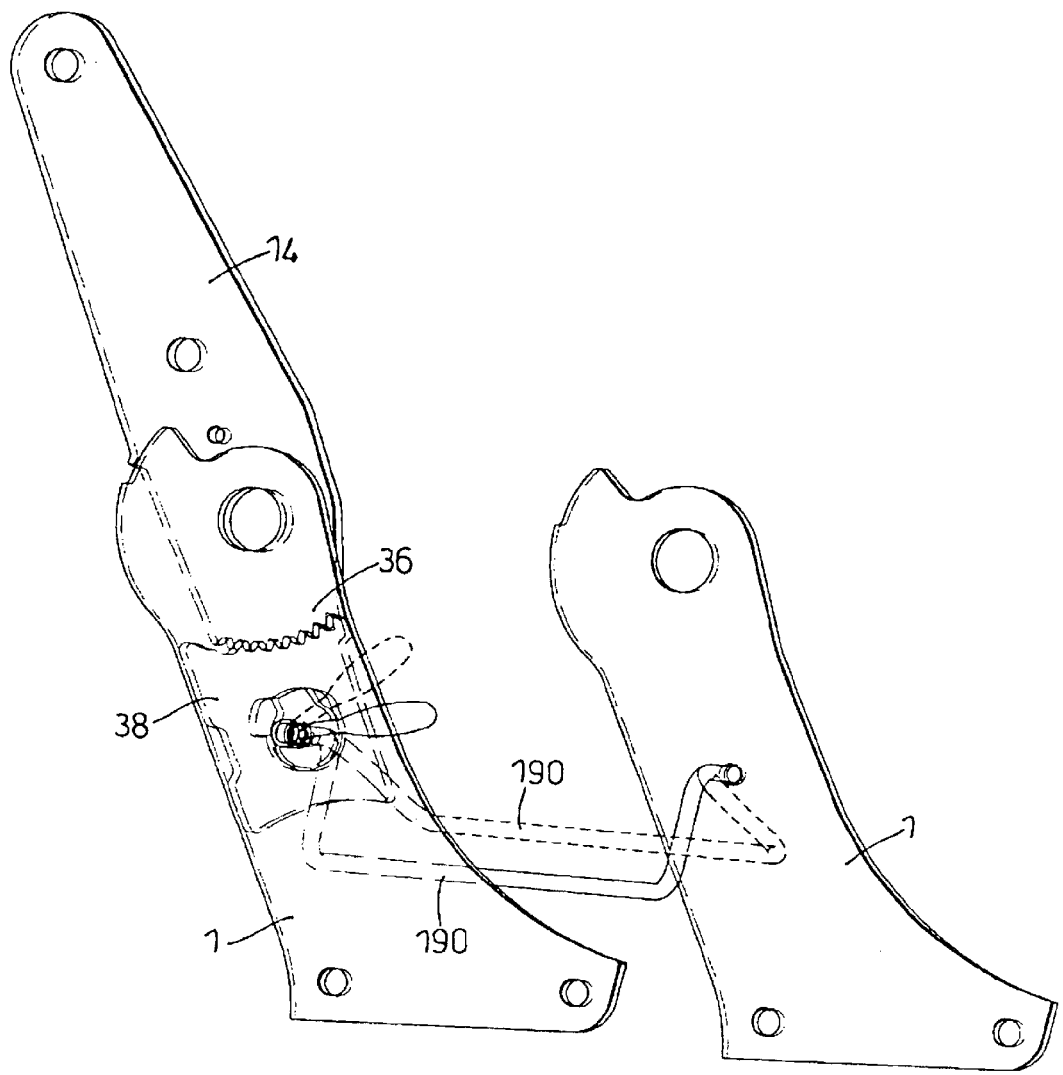
Figure 15:
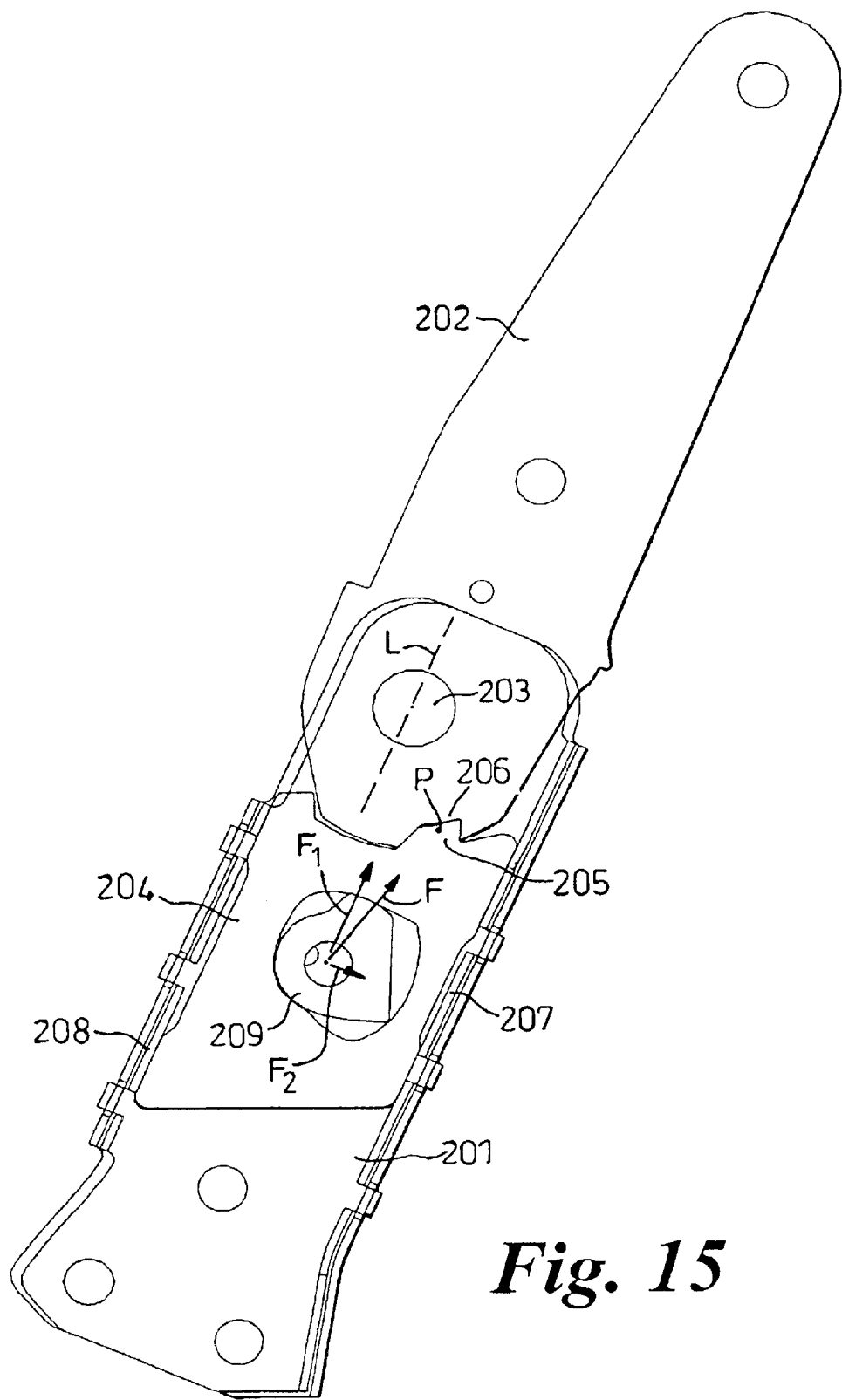
FIGS. 15 to 18 are sectional side views of a fifth pivot mechanism.
Figure 16:
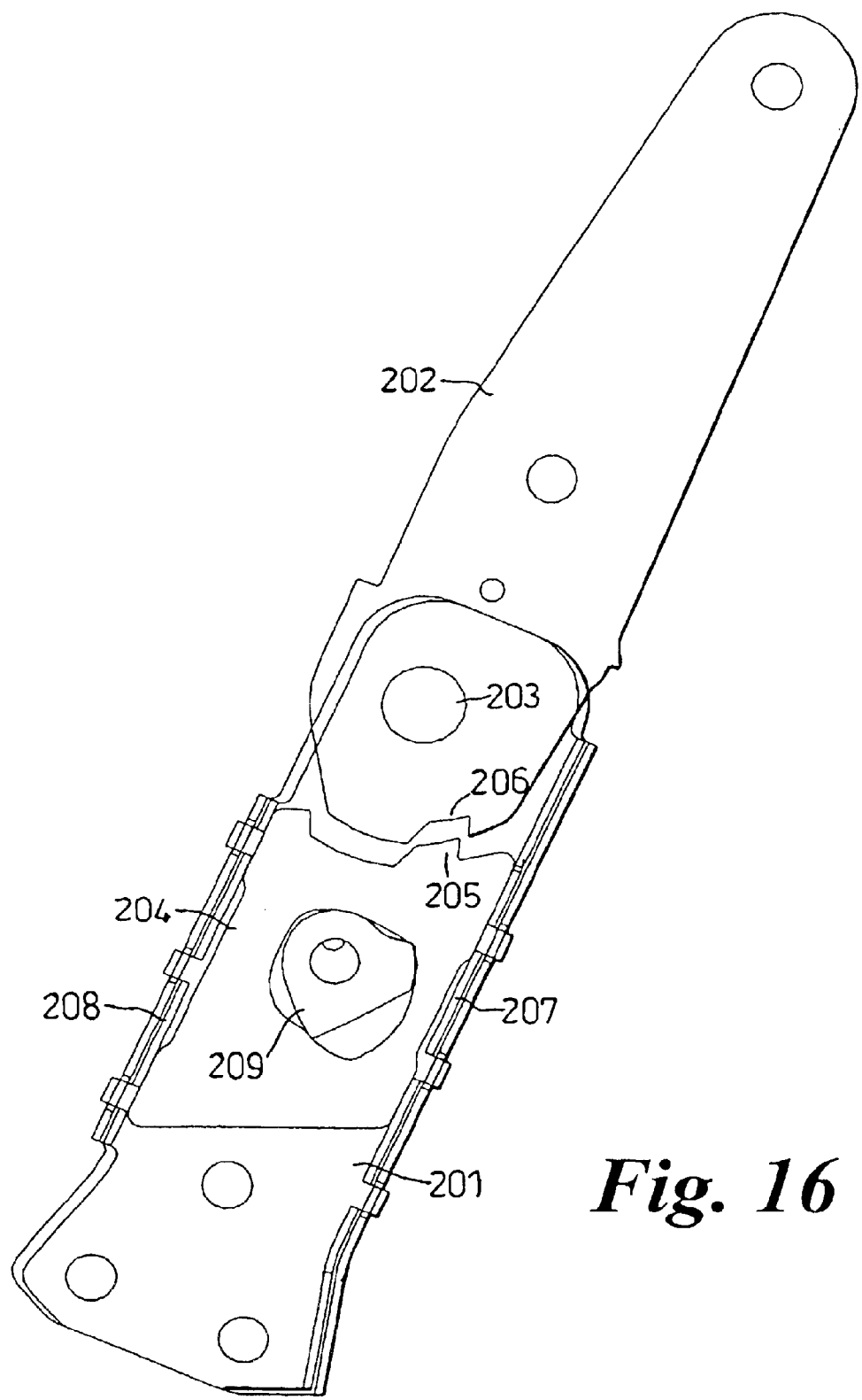
Figure 17:
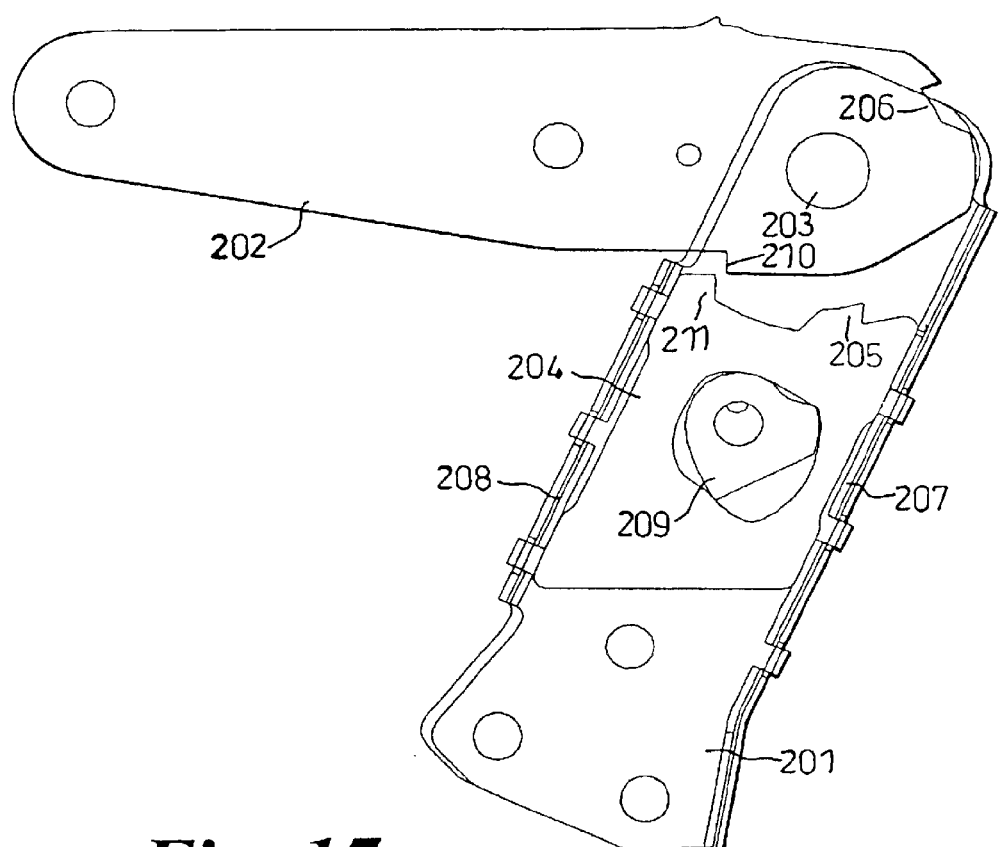
Figure 18:
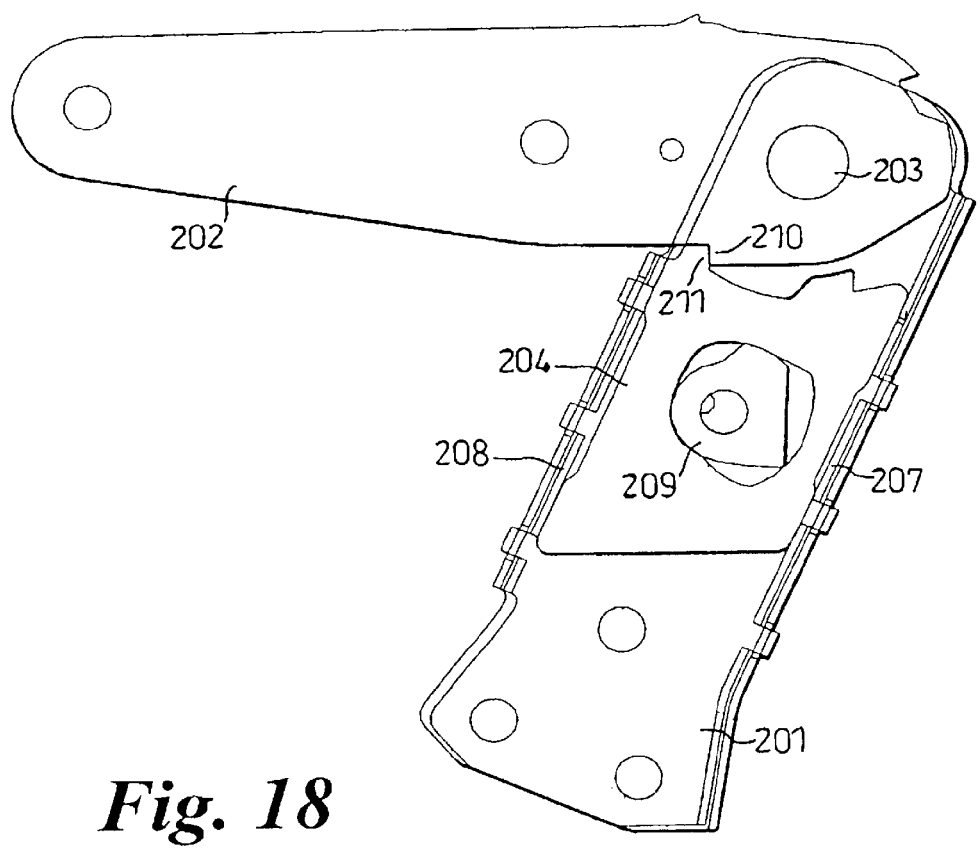
Figure 19:
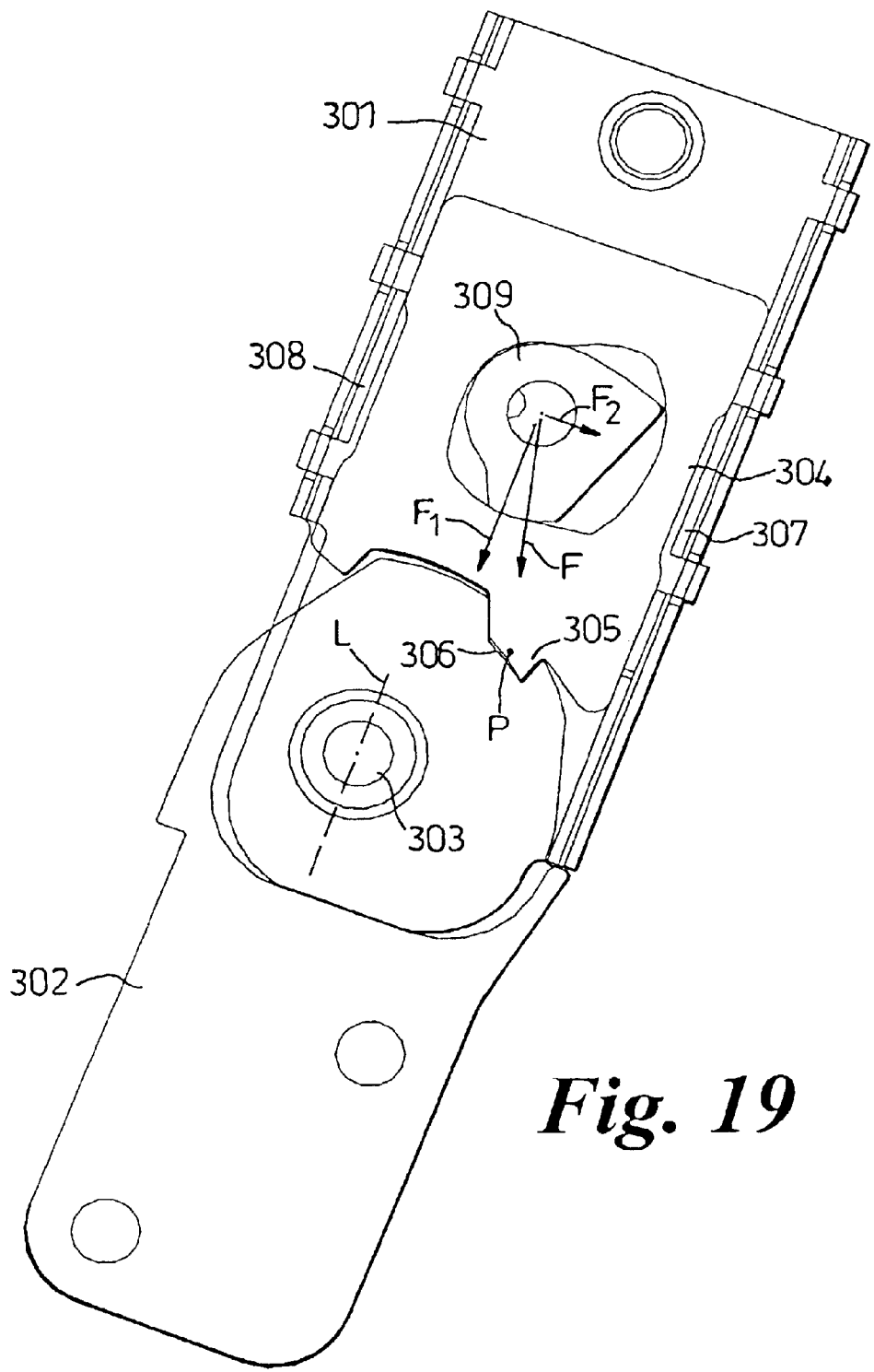
FIGS. 19 to 22 are sectional side views of a sixth pivot mechanism.
Figure 20:
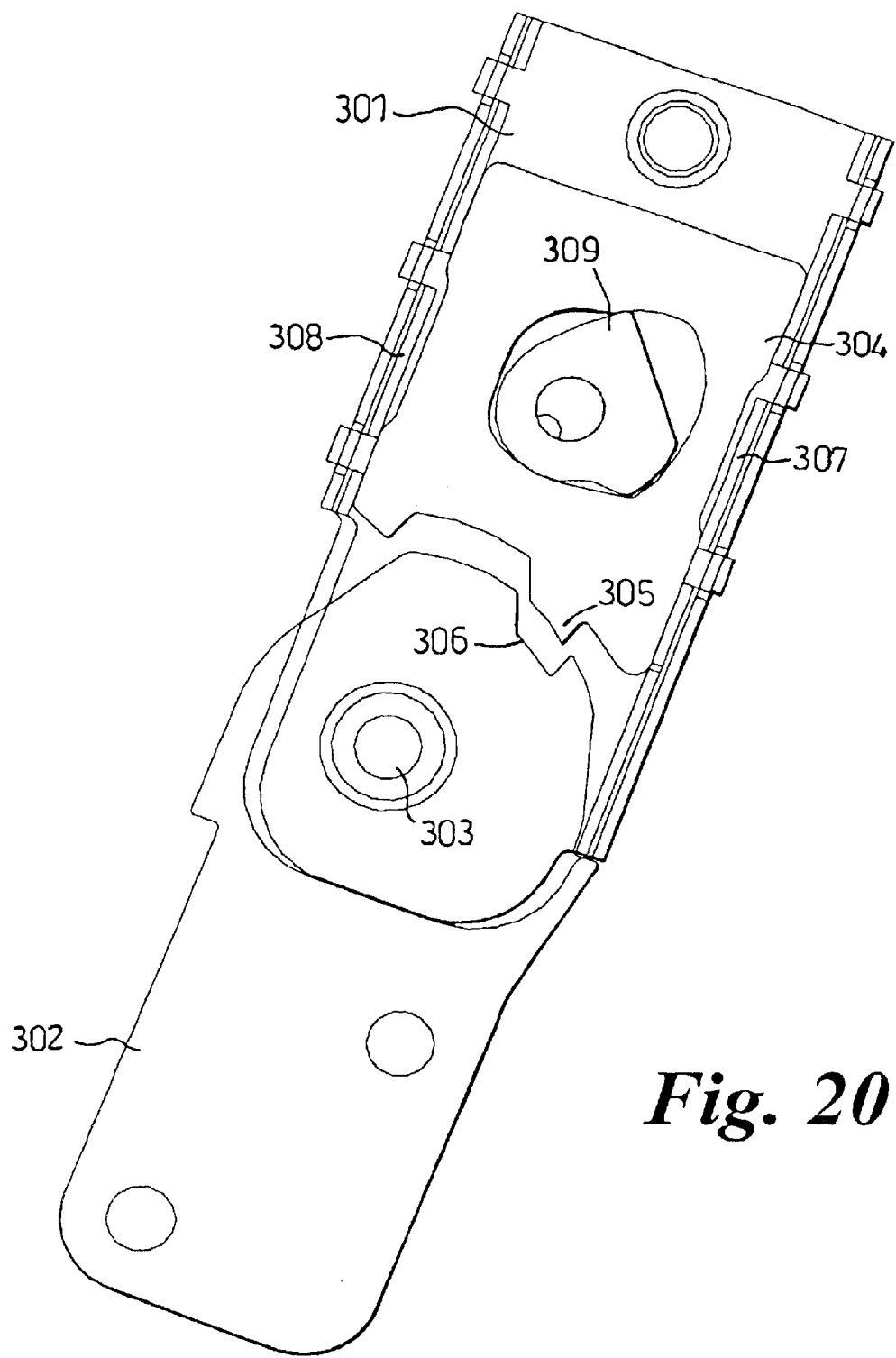
Figure 21:
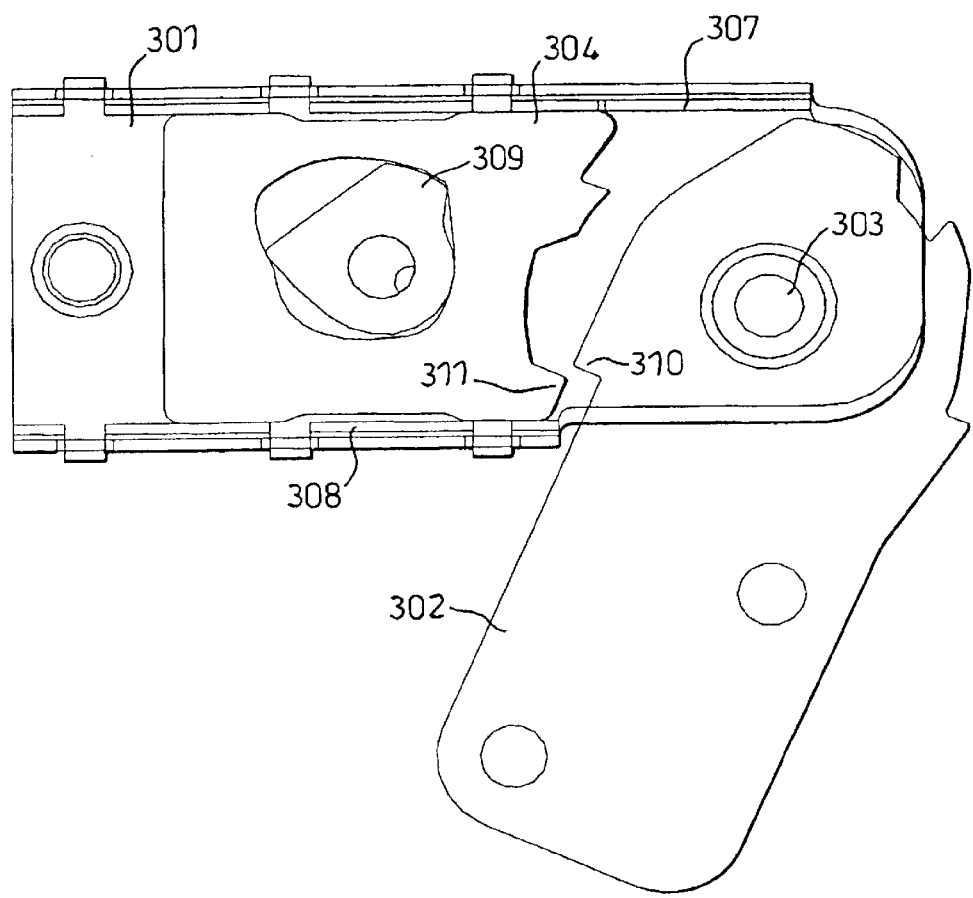
Figure 22:
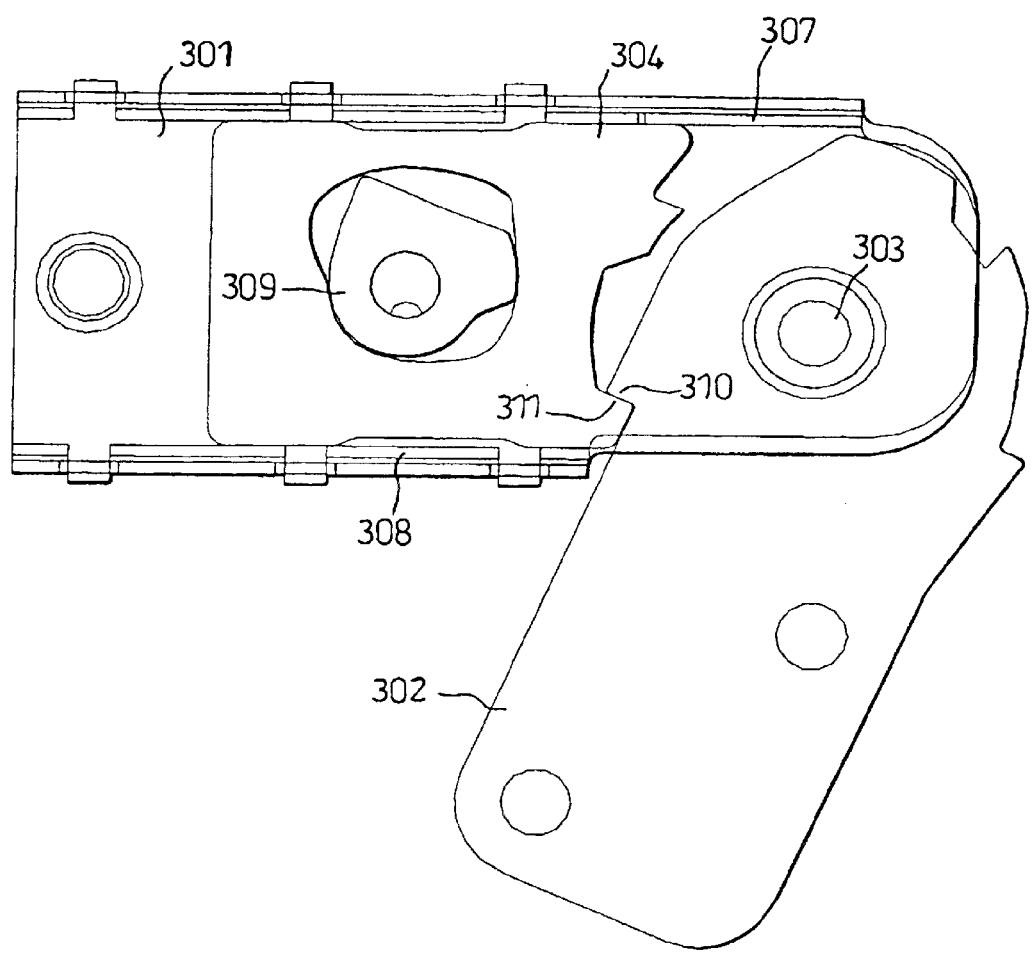
Figure 23:
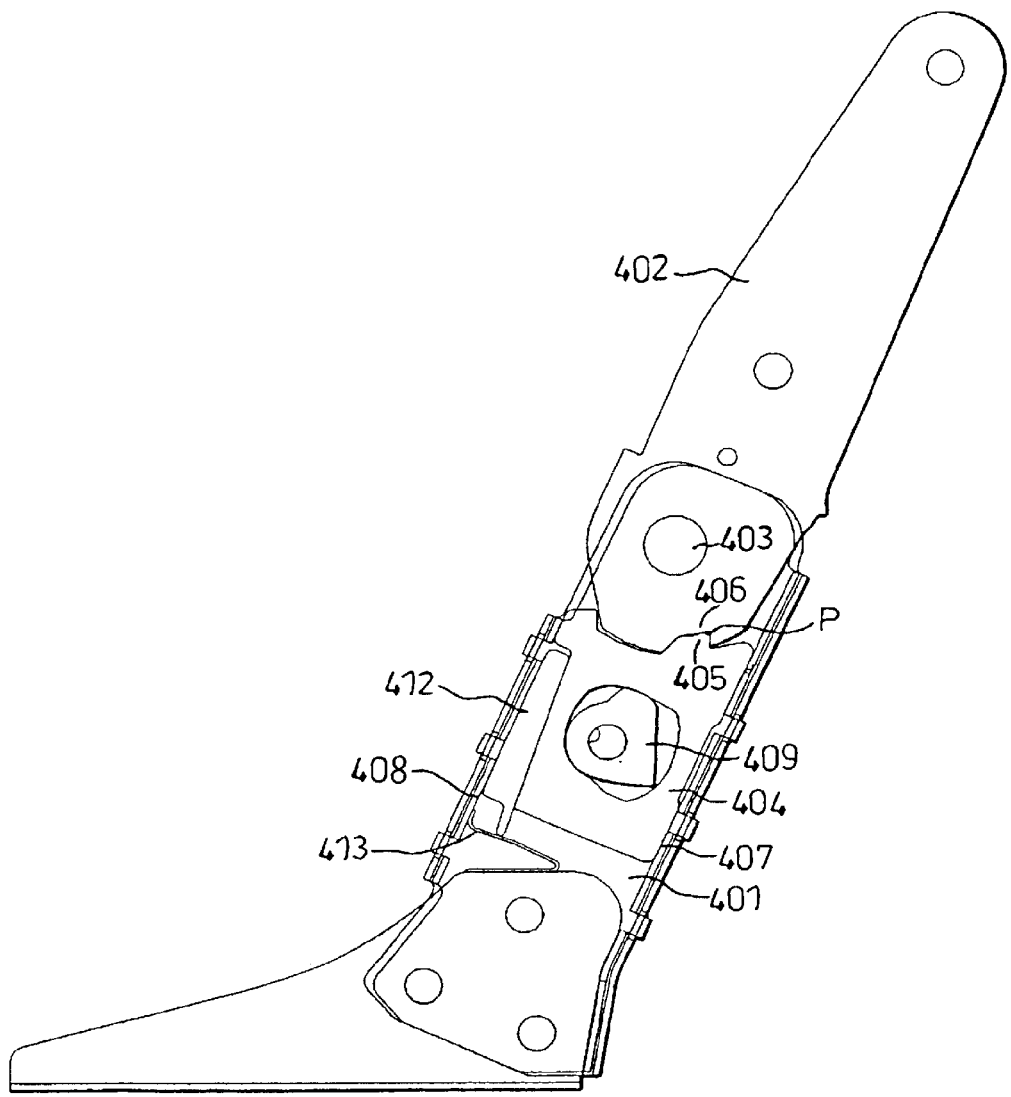
FIGS. 23 to 26 are sectional side views of a seventh pivot mechanism.
Figure 24:
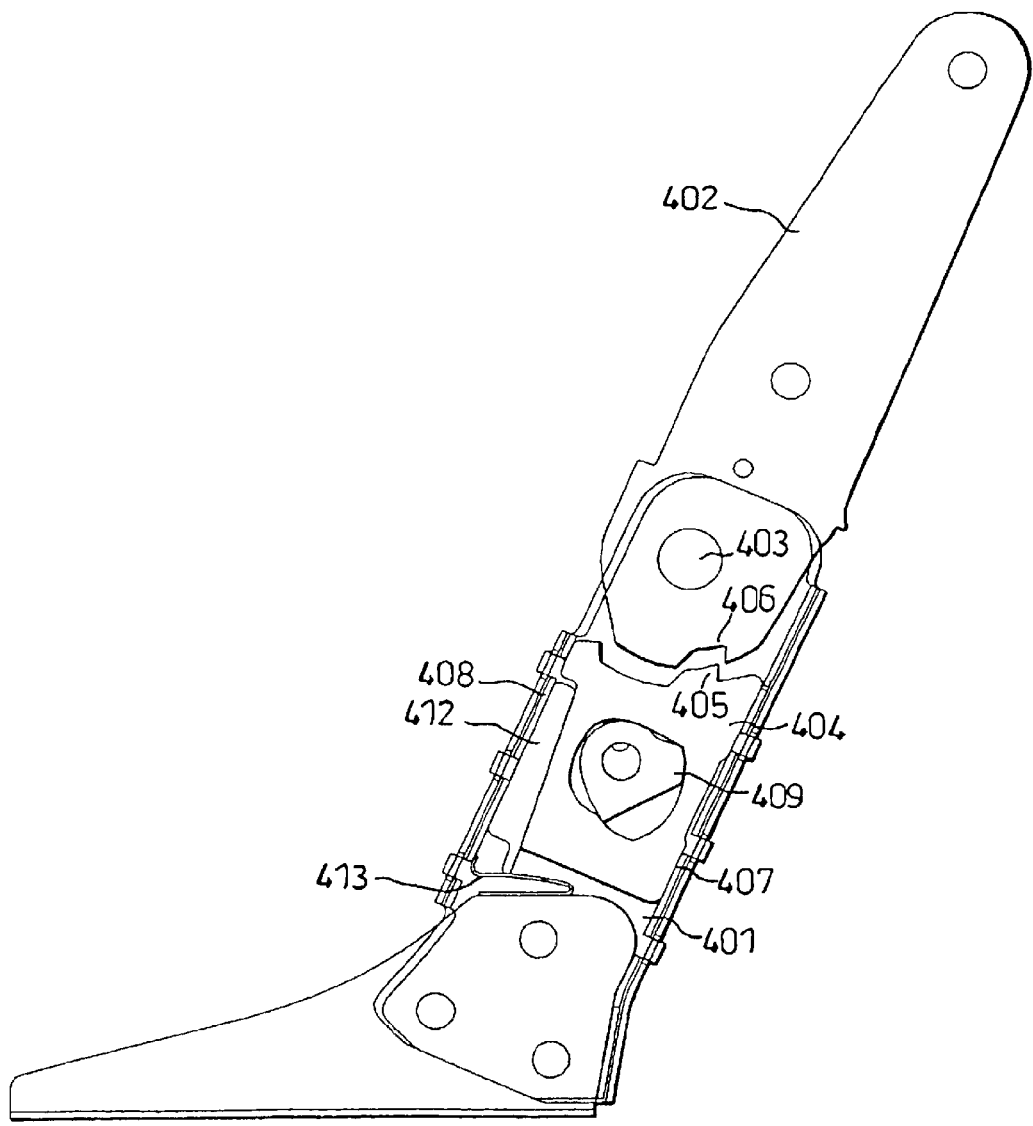
Figure 25:
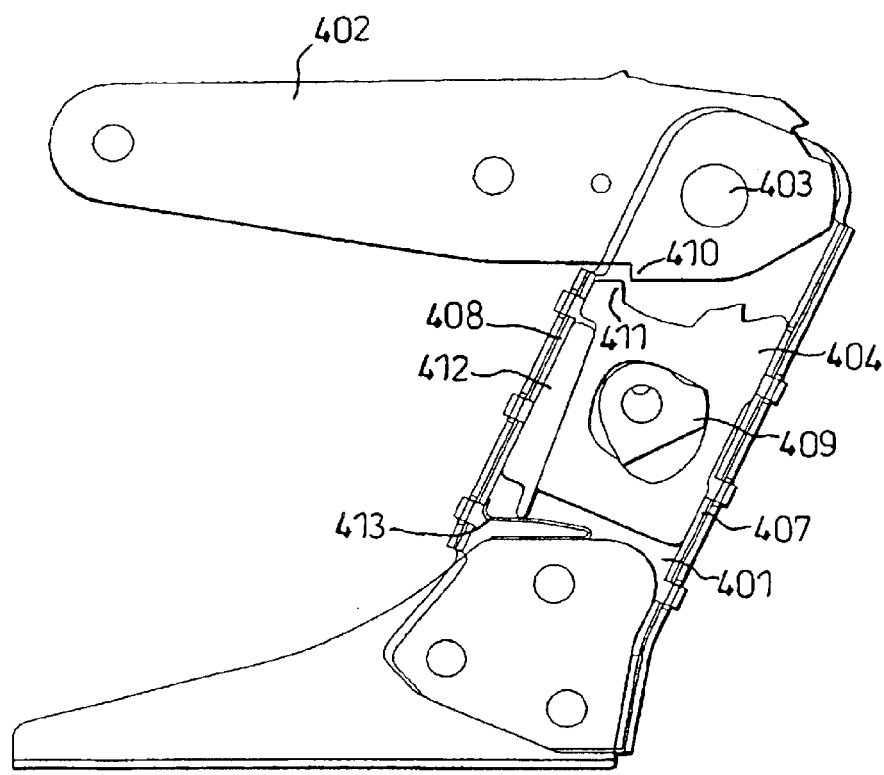
Figure 26:
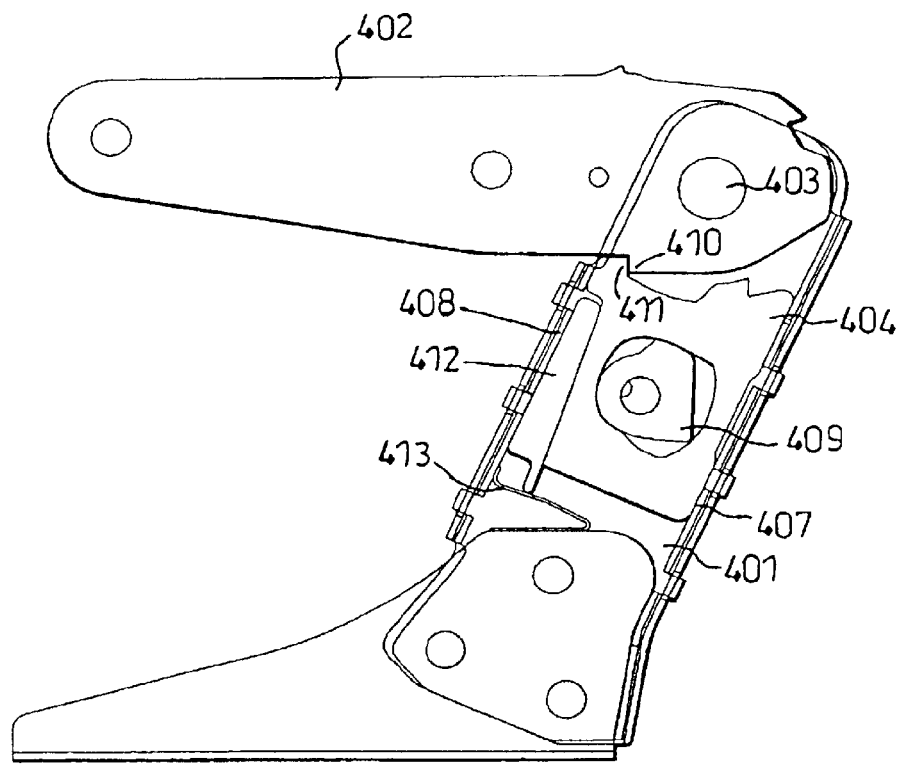
Figure 27:
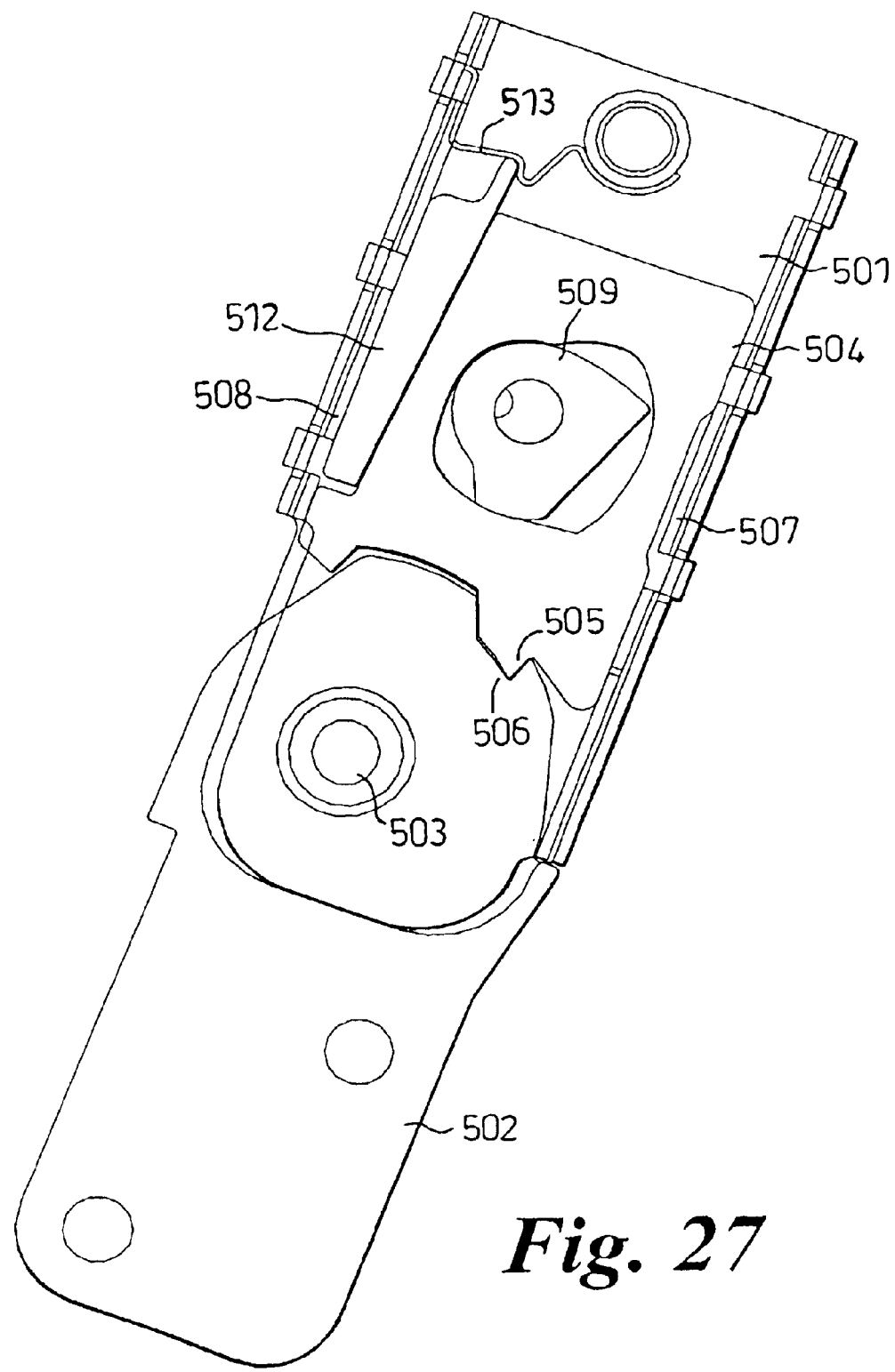
FIGS. 27 to 30 are sectional side views of an eighth pivot mechanism.
Figure 28:
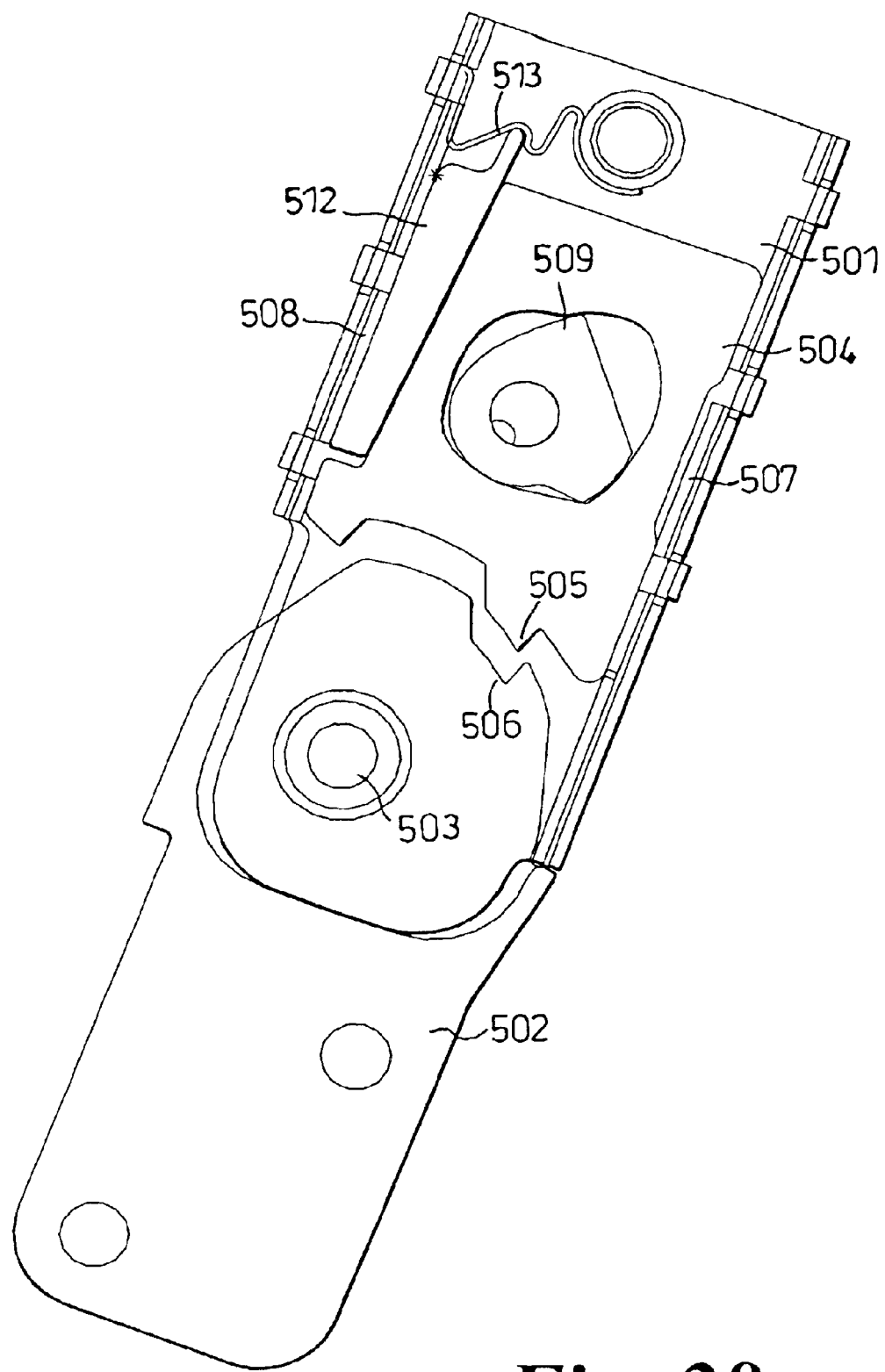
Figure 29:
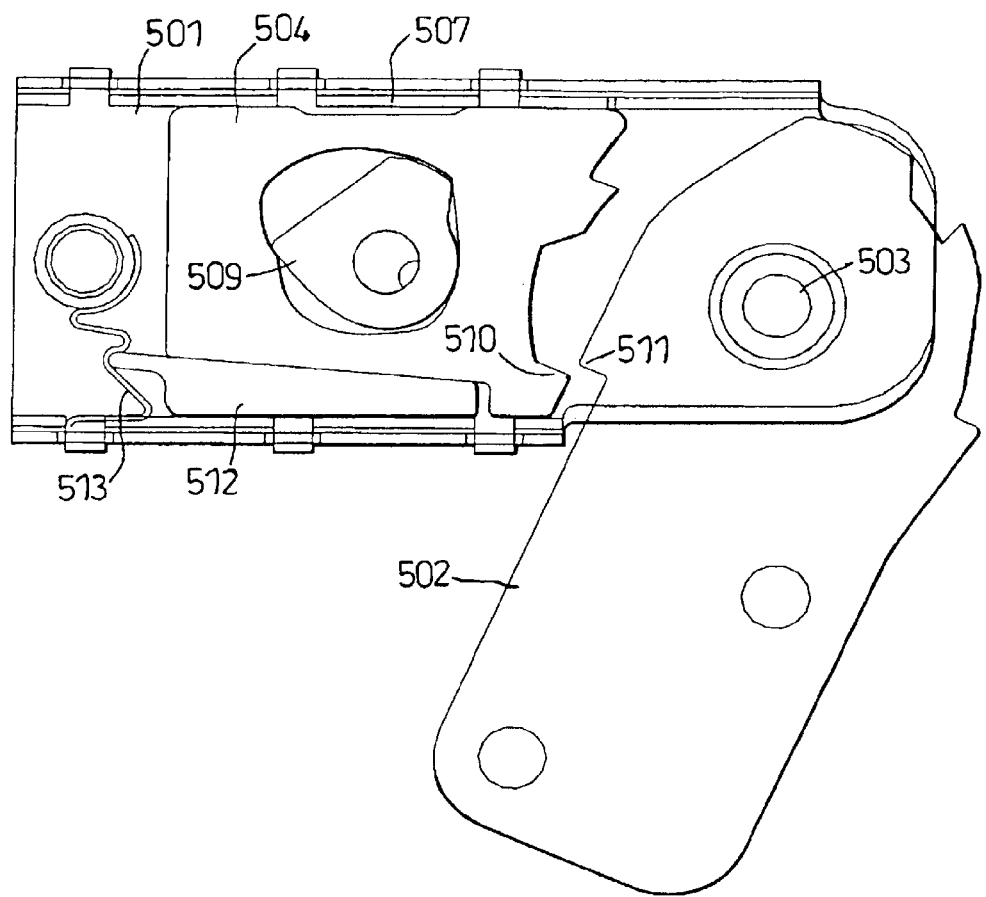
Figure 30:
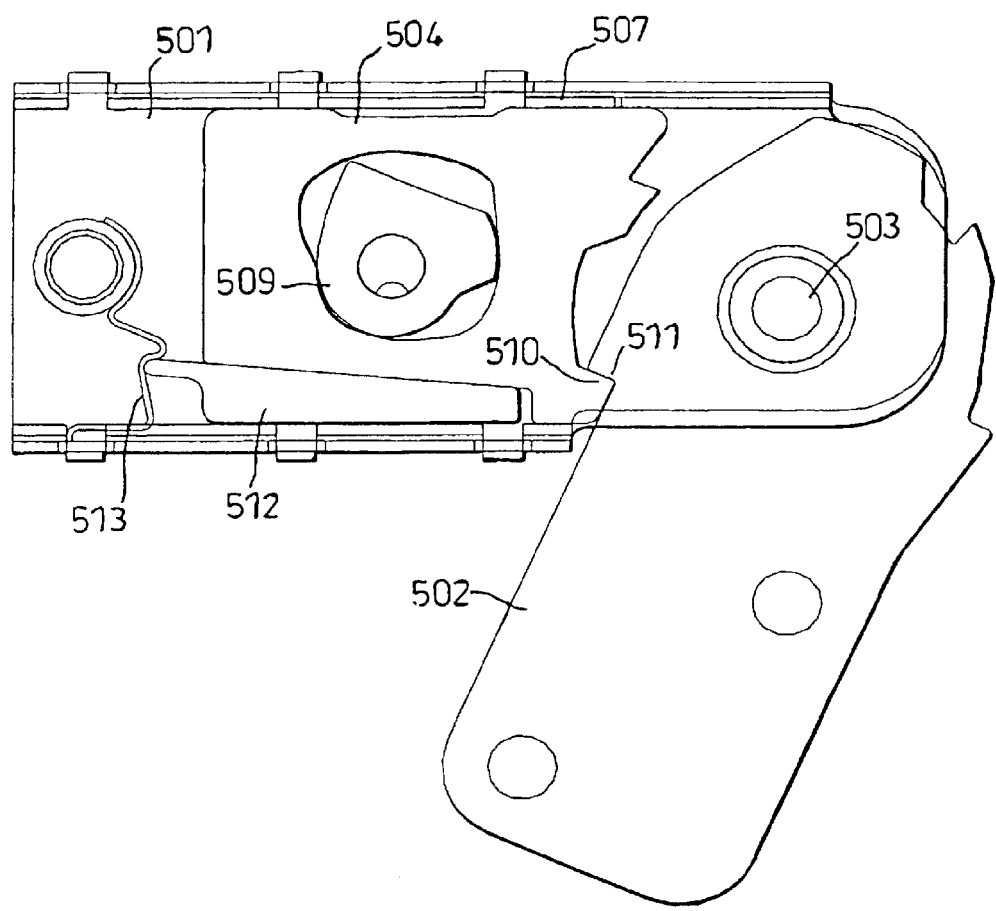

The arrangement shown in FIG. 14 includes two recliner mechanisms a side-by-side, for example at opposite ends of a reclining seat back (not shown), and linked by a cranked connecting bar 190. The connecting bar 190 operates in exactly the same way as the pendulum 180 and, in the event of a rear collision, rotates rearwards from the position shown in broken lines to that shown in full lines, thereby driving the locking member 38 upwards against the convex tooth segment 36 and location the pivot arm 14 in its position.

The recliner mechanism may of course include both types of lock out mechanism, to provide a lock out function in the event of either a frontal or a rearward collision.

A fifth form of the pivot mechanism is shown in FIGS. 15 to 18. The pivot mechanism includes a base member 201

(the "first element") comprising a metal housing, and a pivot arm 202 (the "second element") that is rotatably mounted on the base member via pivot means 203. A locking member 204 has a first locking formation 205 that complements a second locking formation 206 provided on the pivot arm 202, the first locking formation comprising a tooth-like element that engages a similarly-shaped notch in the pivot arm. The two side faces of the tooth and the corresponding side faces of the notch are inclined towards one another to produce a jamming effect as the tooth enters the notch, which prevents chuck between those parts.

The locking member 204 is mounted on the base member 201 between guide members 207,208 comprising the peripheral walls of the housing and is arranged for movement between it locked position (FIG. 15) in which the first and second locking formations are engaged, so preventing rotation of the pivot arm 202, and an unlocked position (FIG. 16) in which the locking formations are disengaged. A control member 209 comprising a rotatable cam is provided in the housing for controlling movement of the locking member.

When the locking member 204 is in the locked position (FIG. 15), the locking member is urged against the pivot arm 202 by the control member 209. The first and second locking formations engage one another at an engagement point P, which is equidistant between the front and rear faces of the first locking element. This engagement point P is located towards the rear guide member 207 and, in particular, is offset from a line L that extends through the pivot axis of the pivot means 203 in the direction of movement of the locking member. The engagement point P is also offset from a line that extends through the axes of the pivot means and the control member.

Owing to the offset position of the engagement point P, the force F acting the locking member has a first component $F_1$ that acts in the direction of movement of the locking member, which locks the pivot arm in position, and a second component $F_2$ that is transverse to the direction of movement of the locking member, which urges the locking member towards the rear guide member 207. This removes chuck (free play) from the mechanism and compensates for wear of the components.

The pivot arm 202 may be rotated to an alternative position (FIG. 17) and locked in that position (FIG. 18) by the engagement of secondary locking formations 210,211 on the pivot arm 202 and the locking member 204. It will be understood that additional alternative locking positions may also be provided.

As indicated above, the base member 201 includes a metal housing, which is formed from two steel plates, those being a flat closing plate and a pressed plate that has a shallow U-shaped cross-section. The raised edges of the pressed plate from the front and rear guide members 208,207. In this example, the two plates are joined together by means of a set of tabs 215 on the edges of the flat plate that engage corresponding openings in the pressed plate. These fixing tabs may of course be replaced by any other suitable fixing method, such as welding.

It should be understood that the structure of the pivot mechanism may be inverted. This is illustrated in FIGS. 19 to 22 in which the pivot arm 301 (the "first element") comprises a metal housing and is rotatably mounted on the fixed base member 302 (the "second element") via a pivot means 303. A looking member 304 has a first locking formation 305 that complements a second locking formation 306 provided on the base member 302. The locking member 304 is mounted on the pivot arm 301 between guide members 307,308 for movement between a locked position (FIG. 19) in which the first and second locking formations are engaged preventing rotation of the pivot arm 301 and an unlocked position (FIG. 20) in which the locking formations are disengaged. A control member 309 is provided for controlling movement of the locking member.

When the locking member 304 is in the locked position (FIG. 19), the locking member is urged against the base member by the control member 309. The first and second locking formations engage one another at an engagement point P, which is offset from a line L that extends through the pivot axis of the pivot means 303 in the direction of movement of the locking member. Owing to the offset position of the engagement point P, the force F acting upon the locking member has a first component $F_1$ that acts in the direction of movement of the locking member, which locks the pivot arm in position, and a second component $F_2$ that is transverse to the direction of movement of the locking member, which urges the looking member towards the rear guide member 307. This removes chuck (free play) from the mechanism and compensates for wear of the components.

The pivot arm 301 may be rotated to an alterative position (FIG. 21) and locked in that position (FIG. 22) by the engagement of secondary locking formations 310,311 on the base member 302 and the locking member 304.

A sixth embodiment of the invention is shown in FIGS. 23 to 26. The pivot mechanism includes a base member 401 (the "first element"), and a pivot arm 402 (the "second element") that is rotatably mounted on the base member via a pivot means 403. A locking member 404 has a first locking formation 405 that complement a second locking formation 406 provided on the pivot arm 402. The locking member 404 is mounted on the base member 401 402 between guide members 407,408 for movement between a locked position (FIG. 23) in which the first and second locking formations are engaged, so preventing rotation of the pivot arm 402, and an unlocked position (FIG. 24) in which the locking formations are disengaged. A control member 409 comprising a cam is provided for controlling movement of the locking member.

The front edge of the locking member is spaced from the front guide member 408 and set at a small acute angle to that guide member, leaving a wedge-shaped gap. A compensating element in the form of a wedge member 412 is urged into the gap between locking member 404 and the guide member 408 by a spring 413. The wedge member 412 removes chuck from the mechanism and compensates for wear of the components.

The pivot arm 402 may be rotated to an alternative position (FIG. 25) and locked in that position (FIG. 26) by the engagement of secondary locking formations 410,411 on the pivot arm 402 and the locking member 404.

It should be understood that the structure of the sixth pivot mechanism may also be inverted. This is illustrated in FIGS. 27 to 30 in which the pivot arm 501 comprises a metal housing and is rotatably mounted on the base member 502 via a pivot means 503. A locking member 504 has a first locking formation 505 that complements a second locking formation 506 provided on the base member 502. The locking member 504 is mounted on the pivot arm 501 between guide members 507,508 for movement between a locked position (FIG. 27) in which the first and second locking formations are engaged, so preventing rotation of the pivot arm 501, and an unlocked position (FIG. 28) in which the locking formations are disengage. A control member 509 is provided for controlling movement of the locking member.

The front edge of the locking member is spaced from the front guide member and set at a small acute angle to that guide member, leaving a wedge-shaped gap. A compensating element in the form of a wedge member 512 is urged into the gap by a spring 513. The wedge member 512 removes chuck and compensates for wear of the component.

The pivot arm 501 may be rotated to an alternative position (FIG. 29) and locked in that position (FIG. 30) by the engagement of secondary locking formations 510,511 on the base member 502 and the locking member 504.

What is claimed is:

1. A pivot mechanism including a first element, a second element that is rotatably mounted on the first element via a pivot means, and a locking mechanism including a convex tooth segment provided on the second element and a locking member having a concave tooth segment, the locking member being mounted for movement between a locked position in which the convex and concave tooth segments are engaged, so preventing rotation of the second element and an unlocked position in which the tooth segments are disengaged; wherein a center of curvature of the convex tooth segment is offset from a center of curvature of the concave tooth segment whereby the convex and concave tooth segments are only partially engaged when the locking member is in the locked position.

2. A pivot mechanism according to claim 1, in which the point of engagement between the tooth segments is towards one end of the concave tooth segment.

3. A pivot mechanism according to claim 1, in which the effective radius of the concave tooth segment is larger than the effective radius of the convex tooth segment.

4. A pivot mechanism according to claim 3, in which the ratio of the effective radii is in the range 1.0–1.3.

5. A pivot mechanism according to claim 4, in which the ratio of the effective radii is in the range 1.1–1.2.

6. A pivot mechanism according to claim 5, in which the ratio of the effective radii is approximately 1.15.

7. A pivot mechanism according to claim 1, in which the centers of curvature of the convex and concave tooth segments are located on a line that is substantially radial with respect to both tooth segments, and said line intersects the concave tooth segment towards one end thereof.

8. A mechanism according to claim 1, including a cam element that engages the locking member and is constructed and arranged to control movement thereof between said locked and unlocked positions, said cam element including a first cam surface for driving the locking member towards the locked position and a second cam surface for driving the locking member towards the unlocked position.

9. A recliner mechanism for a vehicle seat having a seat base and a reclining seat back, said recliner mechanism including a pivot mechanism according to claim 1.

10. A recliner mechanism according to claim 9, including a lock out mechanism for driving the locking member into engagement with the convex tooth segment in the event of a collision.

11. A vehicle seat including seat base and a reclining seat back that is attached to the seat base by means of a recliner mechanism according to claim 9.

12. A pivot mechanism including a first element, a second element that is rotatably mounted on the first element via a pivot means, a locking member having a first locking formation that complements a second locking formation provided on the second element, the locking member being mounted for movement between a locked position in which the first and second locking formations are engaged at an engagement point P, which is offset from a line L that extends through the pivot axis of the pivot means in the direction of movement of the locking member, so preventing rotation of the second element, and an unlocked position in which the locking formations are disengaged, at least one guide member for guiding movement of the locking member and a control member for controlling movement of the locking member; wherein when the locking member is in the locked position, the control member exerts on the locking member a force having a first component that acts in the direction of movement of the locking member and a second component that acts perpendicular to said direction of movement.

13. A pivot mechanism according to claim 12, in which the control member includes a rotatable cam and the first and second locking formations engage one another at an engagement point P, which is offset from a line that extends through the pivot axis of the pivot means and the rotation axis of the cam.

* * * * *